(12) United States Patent
Fortier

(10) Patent No.: US 10,343,636 B2
(45) Date of Patent: Jul. 9, 2019

(54) SIDE PROTECTION DEVICE FOR A VEHICLE, RELATED KIT AND VEHICLE PROVIDED WITH THE SAME

(71) Applicants: Simon Fortier, Piopolis (CA); Sylvain Fortier, Lac Megantic (CA)

(72) Inventor: Paul Henri Fortier, St-Leonard (CA)

(73) Assignees: Simon Fortier, Piopolis (CA); Sylvain Fortier, Lac Megantic (CA)

( * ) Notice: Subject to any disclaimer, the term of this patent is extended or adjusted under 35 U.S.C. 154(b) by 0 days.

(21) Appl. No.: 15/730,290

(22) Filed: Oct. 11, 2017

(65) Prior Publication Data
US 2018/0099632 A1    Apr. 12, 2018

Related U.S. Application Data

(60) Provisional application No. 62/406,570, filed on Oct. 11, 2016.

(51) Int. Cl.
    *B60R 19/56*      (2006.01)
    *B60R 21/34*      (2011.01)

(52) U.S. Cl.
    CPC ............ *B60R 19/565* (2013.01); *B60R 21/34* (2013.01); *B60R 2021/346* (2013.01)

(58) Field of Classification Search
CPC ................. B60R 19/02; B60R 19/565; B60R 2021/0006; B60R 21/34; B60R 2021/343
See application file for complete search history.

(56) References Cited

U.S. PATENT DOCUMENTS 9,463,759 B1    10/2016    Kiefer

FOREIGN PATENT DOCUMENTS

| | | |
|---|---|---|
| DE | 9314565 U1 | 3/1994 |
| DE | 9307911 | 11/1994 |
| FR | 2670458 | 6/1992 |
| JP | 5541633 | 5/2013 |

*Primary Examiner* — James A Shriver, II
*Assistant Examiner* — James J Triggs
(74) *Attorney, Agent, or Firm* — Thomas | Horstemeyer, LLP

(57) ABSTRACT

The invention relates to a side protection device to prevents road users and/or pedestrians to slip, move and/or enter under a vehicle. The device comprises a first member adapted to be secured, under a lateral side of the vehicle; a second member adapted to be secured, under a same lateral side of the vehicle; at least one flexible, elongated member having a first end and a second end opposite to the first end; at least one connecting means for securing the first end of the at least one flexible, elongated member to the first member or the second member; and at least one connecting/tensioning means for securing and tensioning the at least one flexible, elongated member between the first member and the second member. The invention also relates to a vehicle provided with the above device and a kit comprising at least one of the above device.

24 Claims, 26 Drawing Sheets

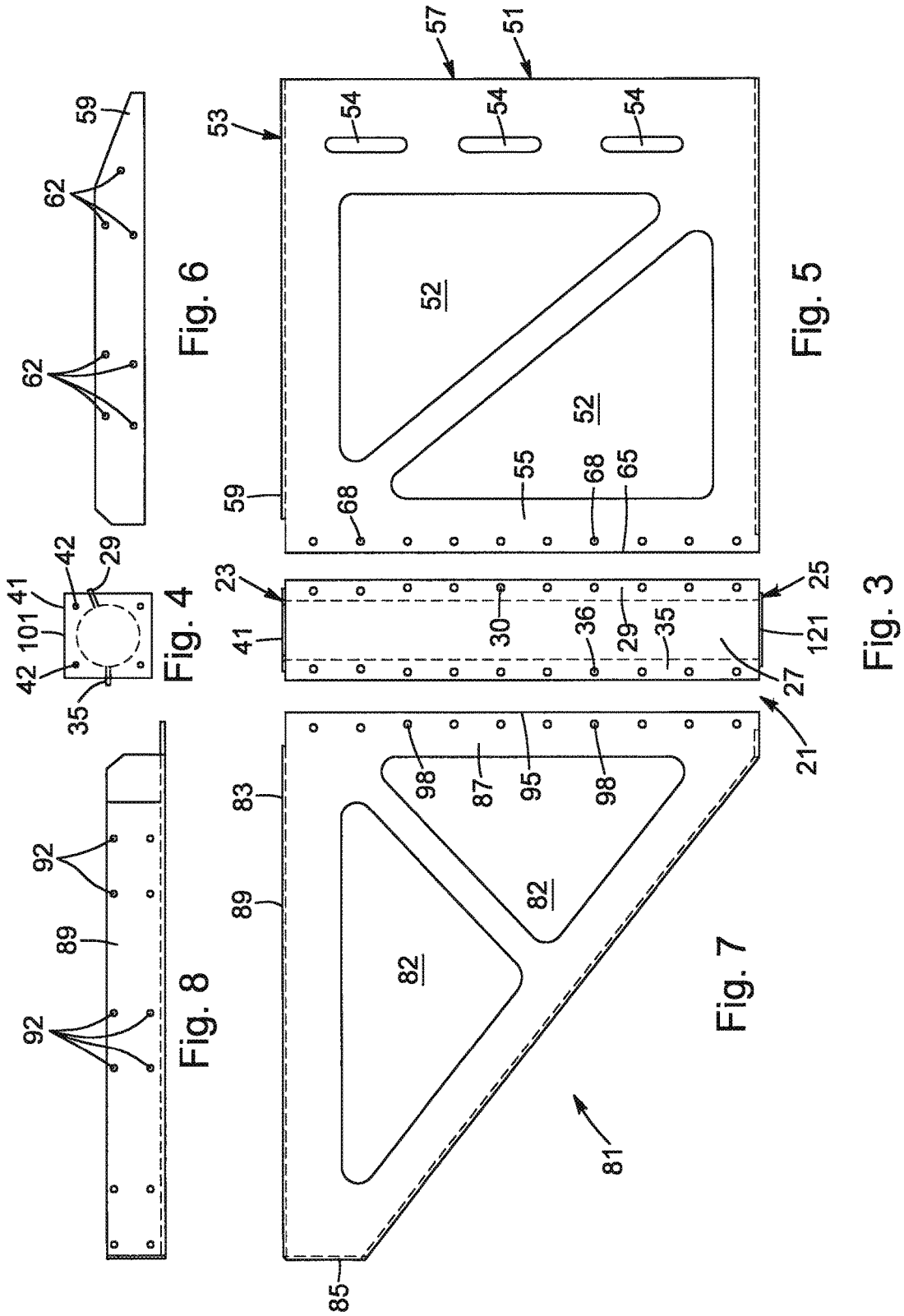

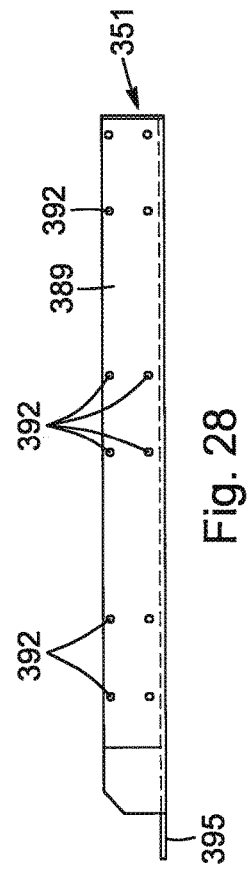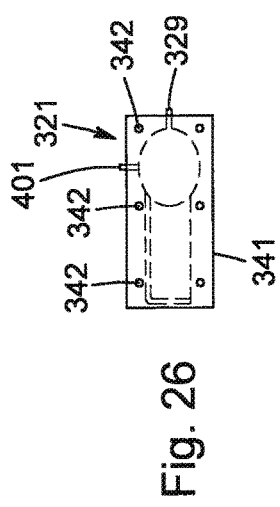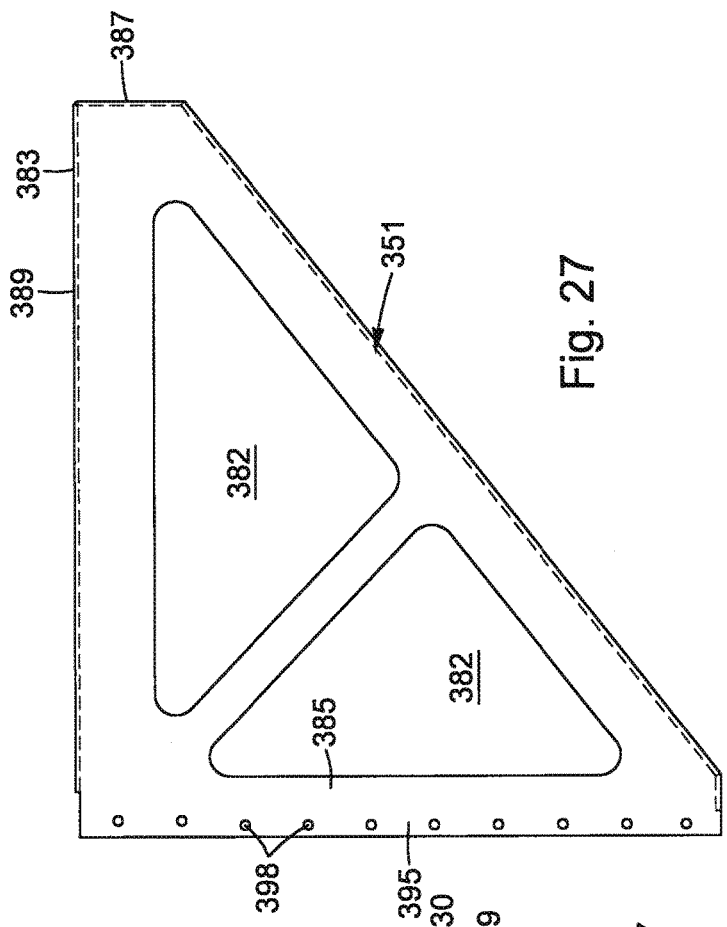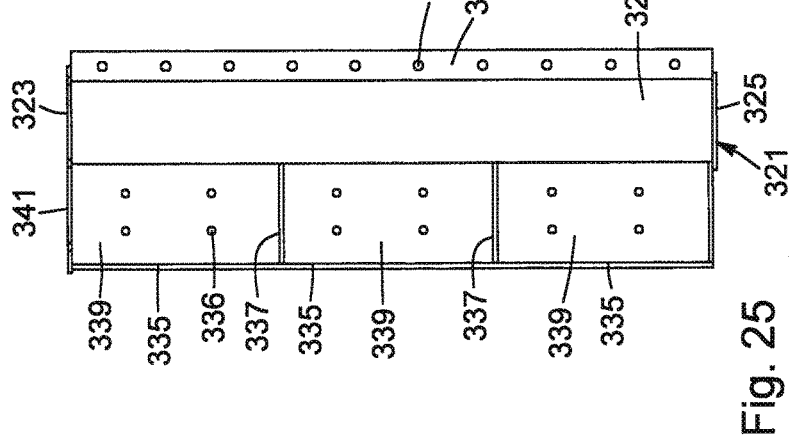

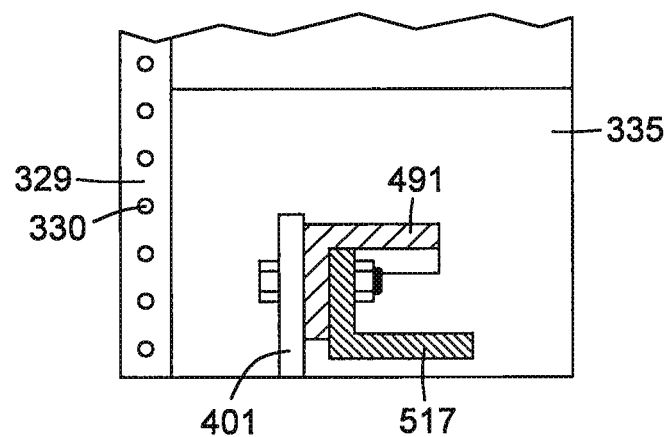
Fig. 45
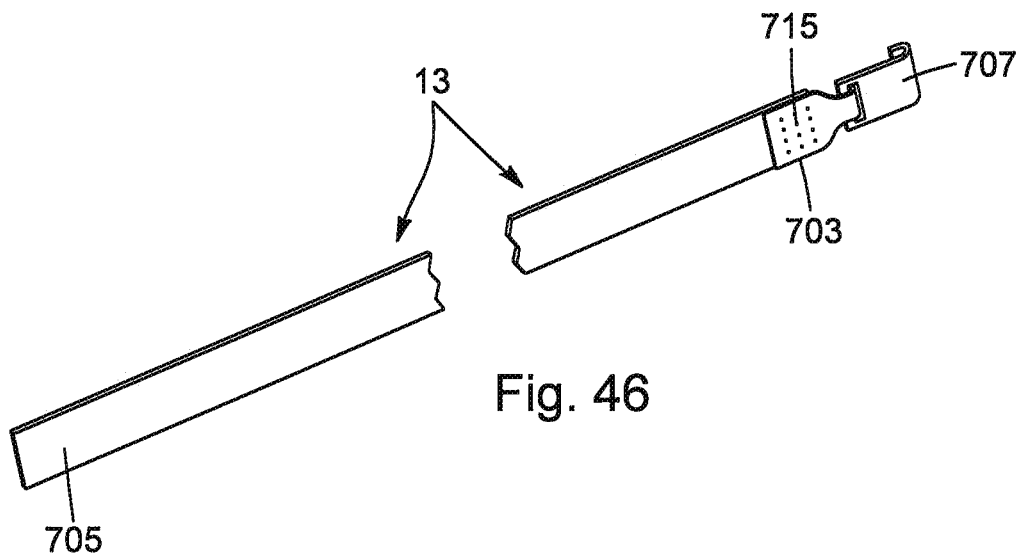
Fig. 46
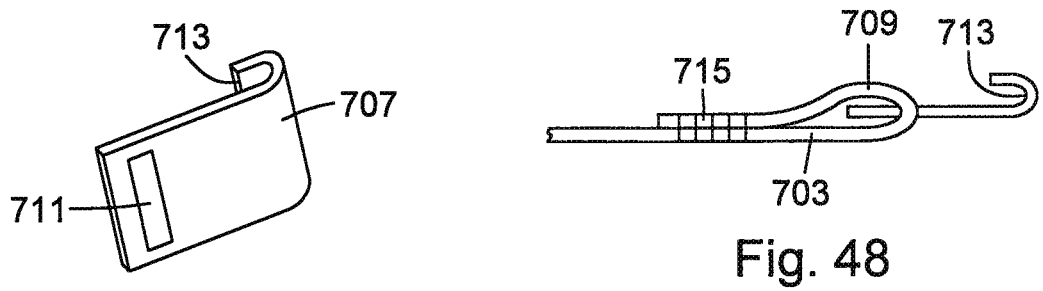
Fig. 47
Fig. 48

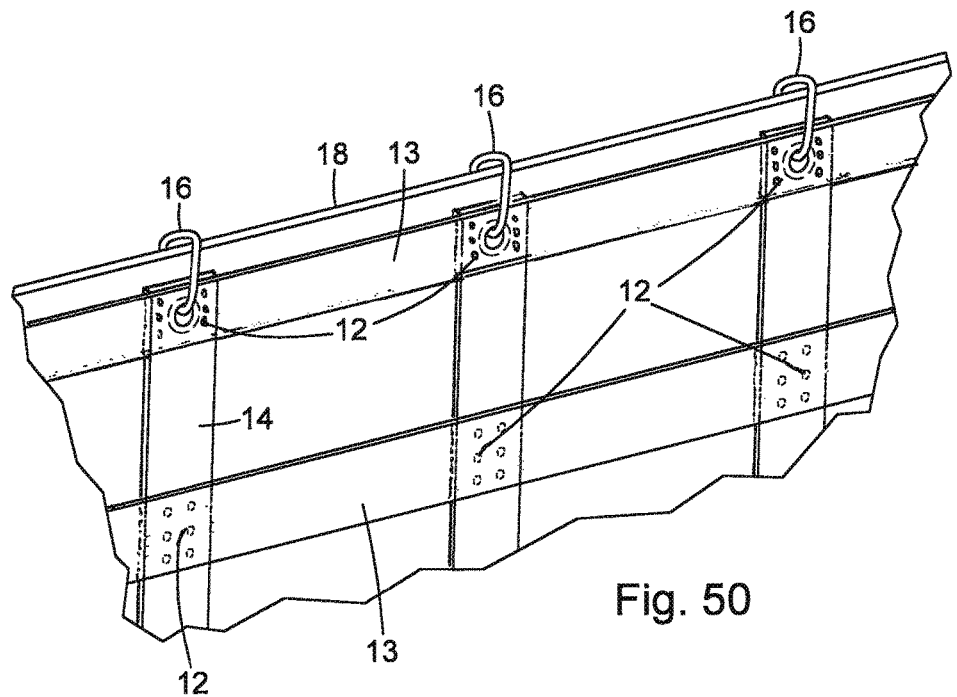
Fig. 50
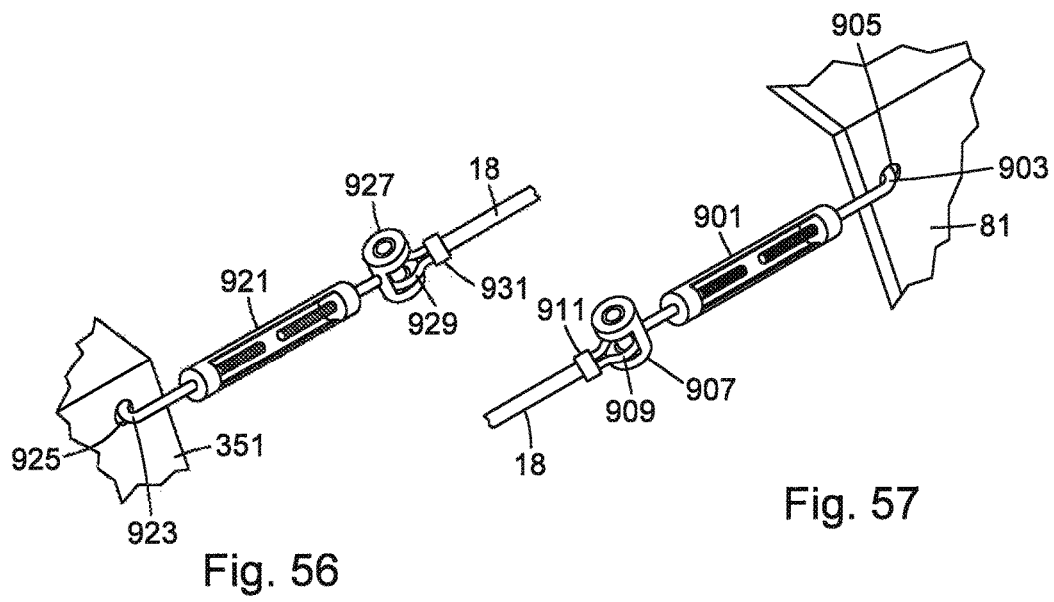
Fig. 56
Fig. 57

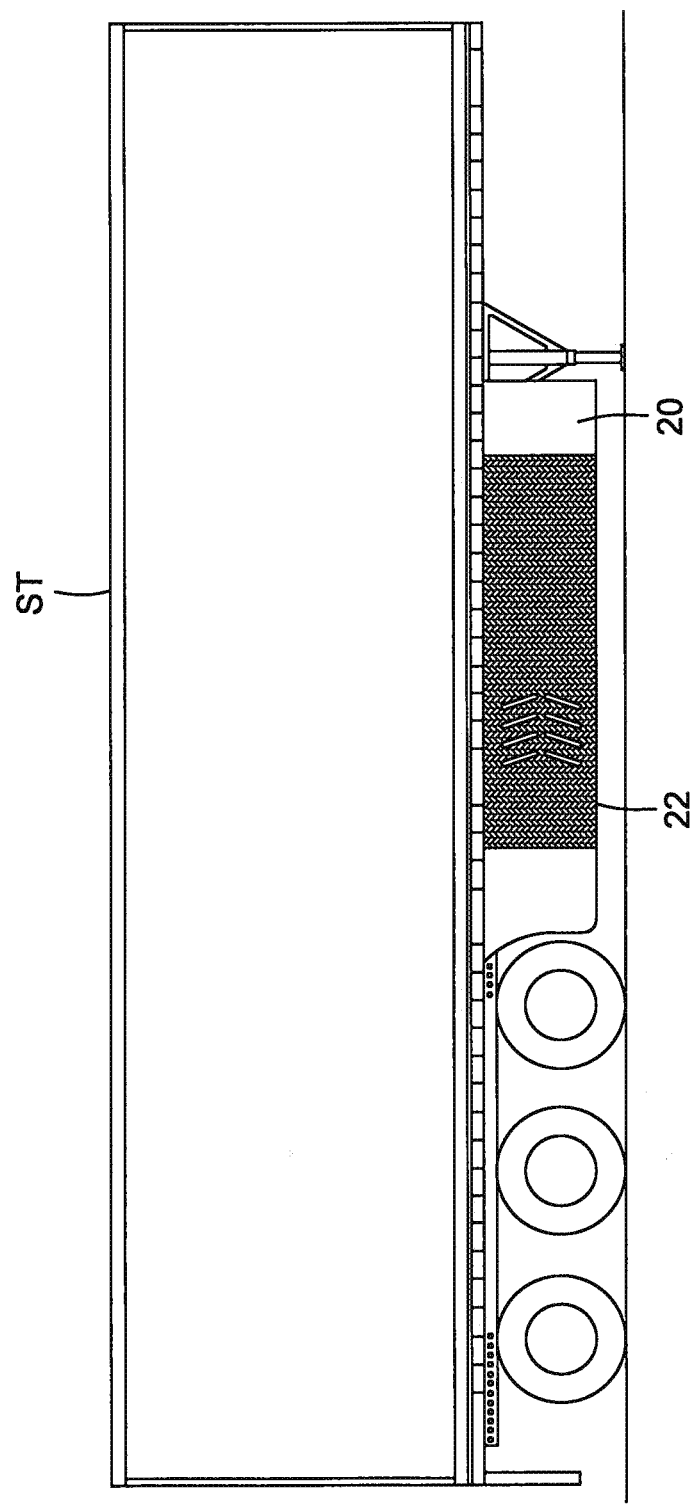

SIDE PROTECTION DEVICE FOR A VEHICLE, RELATED KIT AND VEHICLE PROVIDED WITH THE SAME

CROSS REFERENCE TO A RELATED APPLICATION

The present patent application claims the priority of US provisional application Ser. No. 62/406,570, filed Oct. 11, 2016, the content of which is incorporated herein in its entirety.

FIELD OF THE INVENTION

The present invention generally relates to a side protection device for vehicle, especially vehicle having a substantial ground clearance, and related kit and vehicles provided with the same.

BACKGROUND

Operation of vehicles, especially heavy vehicles and/or vehicles having a substantial ground clearance involves a substantial amount of risks, especially when said vehicles are heavy vehicles including trucks and semi-trailers and/or buses including school buses. More particularly it is well known that operators of such vehicles deal with blind spots and difficulties to clearly see individuals and/or other smaller vehicles (e.g. small cars, motorcycles, cyclists, pedestrians, etc.) which are present or moving close of the heavy vehicles.

Also, when a small vehicle collides laterally with a heavy vehicle having a substantial ground clearance, this small vehicle can penetrate under the heavy vehicles thereby causing fatalities to the individuals of the small vehicle. Alternatively, when a heavy vehicle is moving on a road, a vacuum generated by the motion of the heavy vehicle may pull small cars, motorcycles, cyclists and/or pedestrians underneath the heavy vehicle.

BRIEF DESCRIPTION OF THE PRIOR ART

There exist some side protection devices for heavy vehicles and/or vehicle having a substantial ground clearance. However, such side protection devices are made of rigid frames members increasing the total weight of the vehicles and limiting the access to the underneath of said vehicles for maintenance purposes. Examples of existing side protection devices are described in German patents 9307911 and 9314565, and Japanese patent JP5541633.

Therefore, there is a strong need for a side protection device for vehicles, especially heavy vehicles having a substantial ground clearance and/or buses, that will not substantially increase the total weight of the vehicle and allow an easy access to the underneath of said vehicle for maintenance purposes.

Also, there is a strong need for a side protection device preventing kids to access and/or accidently slip under a bus, especially a school bus.

Also, there is a strong need for a kit allowing to easily and quickly install a side protection device on existing vehicles.

The Applicant has now discovered a side protection device that will overcome drawbacks of existing side protection devices. Also, the Applicant has discovered that this side protection device can be retailed to customers as a kit for an easy and quick installation on existing vehicles.

SUMMARY OF THE INVENTION

According to an embodiment, the invention relates to a side protection device for a vehicle comprising structural elements, a front end and a rear end, the rear end being provided with a rear set of wheels of the vehicle,
wherein said device prevents road users and/or pedestrians to slip, move and/or enter under the vehicle, and
wherein said device comprises:
  a first member adapted to be secured, under a lateral side of the vehicle, to the structural elements, said first member extending downwardly close of the rear of a front wheel or close a cabin of said vehicle, or close of a location where a rear portion of a rear set of wheels of a tractor unit is to be positioned when coupled to said vehicle;
  a second member adapted to be secured, under a same lateral side of the vehicle, to said structural elements, said second member extending downwardly close and ahead a front portion of the rear set of wheels of the vehicle,
  at least one flexible, elongated member having a first end and a second end opposite to the first end;
  at least one connecting means for securing the first end of the at least one flexible, elongated member to the first member or the second member, preferably the first member; and
  at least one connecting/tensioning means for securing and tensioning the at least one flexible, elongated member between the first member and the second member.

According to another embodiment, the invention relates to the side protection device defined hereinabove, wherein the first member comprises:
  a first post provided with a top end; a bottom end; an outer surface; a first band secured or integral with) the outer surface of the first post and extending between the top end and the bottom end of the post, preferably from the top end to the bottom end of the first post; a second band secured or integral with the outer surface of the first post and extending between the top end and the bottom end of the post, preferably from the top end to the bottom end of the first post; and a top plate integral of the top end of the first post;
  a first reinforcing member provided with a top end; a rear end; a front end; a first band secured or integral with the top end; and a second band secured or integral with the rear;
  a second reinforcing member provided with a top end; a rear end; a front end; a first band secured or integral with the top end; and a second band secured or integral with the front end;
  at least one fastener for securing the top plate with at least one of the structural elements of the vehicle;
  at least one fastener for securing the first band of the first reinforcing member with at least one of the structural elements of the vehicle;
  at least one fastener for securing the first band of the second reinforcing member with at least one of the structural elements of the vehicle;
  at least one fastener securing the first band of the first post with the second band of the first reinforcing member; and
  at least one fastener securing the second band of the first post with the second band of the second reinforcing member.

According to another embodiment, the invention relates to the side protection device defined hereinabove, wherein the first post further comprises:
- a third band secured or integral with the outer surface of the post and extending near the bottom end of the first post;
- at least one first reinforcement brace having a first end and a second end;
- at least one fastener securing the third band with the first end of the at least one first reinforcement brace; and
- at least one fastener for securing the second end of the at least one first reinforcement brace with at least one of the structural elements of the vehicle.

According to another embodiment, the invention relates to the side protection device defined hereinabove, wherein the second member comprises:
- a second post provided with a top end; a bottom end; an outer surface; a first band secured or integral with the outer surface of the second post and extending between the top end and the bottom end of the second post, preferably from the top end to the bottom end of the second post; a second band secured or integral with the outer surface of the second post and extending between the top end and the bottom end of the second post, preferably from the top end to the bottom end of the second post; and a top plate secured or integral with the top end of the second post;
- a third reinforcing member provided with a top end; a rear end; a front end; a first band secured or integral with the top end; and a second band secured or integral with the rear end;
- at least one fastener for securing the top plate with at least one of the structural elements of the vehicle;
- at least one fastener for securing the first band of the third reinforcing member with at least one of the structural elements of the vehicle; and
- at least one fastener securing the first band of the first post with the second band of the third reinforcing member.

According to another embodiment, the invention relates to the side protection device defined hereinabove, wherein the second post further comprises
- a third band secured or integral with the outer surface of the second post;
- at least one second reinforcement brace having a first end and a second end;
- at least one fastener securing the third band with the first end of the at least one second reinforcement brace; and
- at least one fastener for the securing of the second end of the at least one second reinforcement brace with at least one of the structural elements of the vehicle.

According to another embodiment, the invention relates to the side protection device defined hereinabove, wherein the first member comprises:
- a first post provided with:
  - a top end, a bottom end and an outer surface;
  - a first band secured or integral with the outer surface of the first post and extending between the top end and the bottom end of the post, preferably from the top end to the bottom end of the first post, the first band being provided with means adapted to be engaged by at least one fastener;
  - a second band secured or integral with the outer surface of the first post and extending between the top end and the bottom end of the post, preferably from the top end to the bottom end of the first post, the second band being provided with means adapted to be engaged by at least one fastener; and
  - a top plate secured or integral with the top end of the first post and provided with means adapted to be engaged by at least one fastener;
- a first reinforcing member provided with:
  - a top end, a rear end and a front end;
  - a first band secured or integral with the top end and provided with means adapted to be engaged by at least one fastener; and
  - a second band secured or integral with the rear end and provided with means adapted to be engaged by at least one fastener;
- a second reinforcing member provided with:
  - a top end, a rear end and a front end;
  - a first band secured or integral with the top end and provided with means adapted to be engaged with at least one fastener;
  - a second band secured or integral with the front end and provided with means adapted to be engaged by at least one fastener;
- at least one fastener for engaging the means of the top plate adapted for receiving the at least one fastener and engaging at least one of the structural elements of the vehicle, for the securing the top plate with the at least one of the structural elements of the vehicle;
- at least one fastener for engaging the means of the first band of the first reinforcing member, said means being adapted to be engaged by the at least one fastener, and engaging at least one of the structural elements of the vehicle, for the securing the first band with the at least one of the structural elements of the vehicle;
- at least one fastener for engaging the means of the first band of the second reinforcing member, said means being adapted to be engaged by the at least one fastener, and engaging at least one of the structural elements of the vehicle for securing the first band of the second reinforcing member with the at least one of the structural elements of the vehicle;
- at least one fastener engaging the means of the first band of the first post, said means being adapted to be engaged by the at least one fastener, and engaging the means of the second band of the first reinforcing member, said means being adapted to be engaged by the at least one fastener; for securing the first band of the first post with the second band of the first reinforcing member; and
- at least one fastener engaging the means of the second band of the first post, said means being adapted to be engaged by the at least one fastener, and engaging the means of the second band of the second reinforcing member, said means being adapted to be engaged by the at least one fastener, for securing the second band of the first post with the second band of the second reinforcing member.

According to another embodiment, the invention relates to the side protection device defined hereinabove, wherein the first post further comprises
- a third band secured or integral with the outer surface of the post and extending near the bottom end of the first post, said third band being provided with means adapted to be engaged by at least one fastener;
- at least one first reinforcement brace having a first end and a second end, the first end being provided with means adapted to be engaged by at least one fastener; and the second end being provided with means adapted to be engaged by at least one fastener;
- at least one fastener engaging the means of the third band, said means being adapted to be engaged by the at least one fastener, and engaging the means of the first end of the at least one first reinforcement brace, said means being adapted to be engaged by the at least one fastener, for securing the third band with the first end of the at least one first reinforcement brace; and at least one fastener for engaging the means of the second end of the at least one first reinforcement brace, said means being adapted to be engaged by the at least one fastener, and engaging at least one of the structural elements of the vehicle, for the securing of the second end of the at least one first reinforcement brace with the at least one of the structural elements.

According to another embodiment, the invention relates to the side protection device defined hereinabove, wherein the second member comprises:
- a second post provided with:
  - a top end, a bottom end and an outer surface;
  - a first band secured or integral with the outer surface of the second post and extending between the top end and the bottom end of the second post, preferably from the top end to the bottom end of the second post, the first band being provided with means adapted to be engaged by at least one fastener;
  - a second band secured or integral with the outer surface of the second post and extending between the top end and the bottom end of the second post, preferably from the top end to the bottom end of the second post, the second band being provided with means adapted to be engaged by at least one fastener; and
  - a top plate secured or integral with the top end of the second post and provided with means adapted to be engaged with at least one fastener;
- a third reinforcing member provided with:
  - a top end, a rear end and a front end;
  - a first band secured or integral with the top end and provided with means adapted to be engaged with at least one fastener; and
  - a second band secured or integral with the rear end and provided with means adapted to be engaged by at least one fastener;
- at least one fastener for engaging the means of the top plate adapted to be engaged by the at least one fastener, and engaging at least one of the structural elements of the vehicle, for the securing of the top plate with the at least one of the structural elements of the vehicle;
- at least one fastener for engaging the means of the first band of the third reinforcing member, said means being adapted to be engaged by the at least one fastener, and engaging at least one of the structural elements of the vehicle, for the securing of the first band of the third reinforcing member with the at least one of the structural elements of the vehicle; and
- at least one fastener engaging the means of the first band of the second post, said means being adapted to be engaged by the at least one fastener, and engaging the means of the second band of the third reinforcing member, said means being adapted to be engaged by the at least one fastener, for securing the first band of the second post with the second band of the third reinforcing member.

According to another embodiment, the invention relates to the side protection device defined hereinabove, wherein the second post further comprises
- a third band secured or integral with the outer surface of the second post and extending near the bottom end of the second post, said third band being provided with means adapted to be engaged by at least one fastener;
- at least one second reinforcement brace having a first end and a second end, the first end being provided with means adapted to be engaged by at least one fastener; and the second end being provided with means adapted to be engaged by at least one fastener;
- at least one fastener engaging the means of the third band, said means being adapted to be engaged by the at least one fastener, and engaging the means of the first end of the at least one second reinforcement brace, said means being adapted to be engaged by the at least one fastener, for securing the third band with the first end of the at least one second reinforcing brace; and
- at least one fastener for engaging the means of the second end of the at least one second reinforcement brace, said means being adapted to be engaged by the at least one fastener, and engaging at least one of the structural elements of the vehicle, for the securing of the second end of the at least one second reinforcement brace with the at least one of the structural elements of the vehicle.

According to another embodiment, the invention relates to the side protection device defined hereinabove, wherein it comprises:
- from 2 to 4 flexible, elongated members, each flexible, elongated member having a first end and a second end opposite to the first end;
- from 2 to 4 connecting means for connecting the first end of the at least one flexible, elongated member to the first member; and
- from 2 to 4 connecting/tensioning means for connecting and tensioning the at least one flexible, elongated member between the first member and the second member.

According to another embodiment, the invention relates to the side protection device defined hereinabove, wherein for each flexible, elongated member,
- the at least one connecting member is a two-part connector, one part of said two-part connector being secured to the front end of the first reinforcing member and provided with a longitudinal cavity communicating with a longitudinal slot oriented toward the rear of the vehicle, the width of the slot being smaller than the transversal cross-section of the cavity;
- the at least one connecting/tensioning means for connecting and tensioning the flexible, elongated member between the first member and the second member; is a tie-down winch comprising a frame, a winch drum provided with an opening, a ratchet wheel and a pawl, the base of said tie-down winch being secured to the second band of the reinforcing member of the second member; and
- the flexible, elongated member is a strap made of synthetic material having a high resistance to deformation and impact, the first end of the strap being provided with a portion defining the other part of said two-part connector, said portion being formed by a key element housed within a hem of the strap, and said key element being sized and shaped for longitudinal sliding within the cavity and transversal locking within said cavity.

According to another embodiment, the invention relates to the side protection device defined hereinabove, wherein for each flexible, elongated member,
- the at least one connecting member is a two-part connector comprising a first part and a second part, the first part of said two-part connector being an opening oriented and size to receive a second part of said two-part connector;

the at least one connecting/tensioning means for connecting and tensioning the flexible, elongated member between the first member and the second member; is a tie-down winch comprising a frame, a winch drum provided with an opening, a ratchet wheel and a pawl, the base of said tie-down winch being secured to the second band of the reinforcing member of the second member; and the flexible, elongated member is a strap made of synthetic material having a high resistance to deformation and impact, the first end of the strap being provided with a portion provided with a hook element which is defining the second part of said two-part connector, said hook element being oriented and sized to engage the opening of the first part of the two-part connector.

According to another embodiment, the invention relates to the side protection device defined hereinabove, further comprising a plurality of transversal flexible, members, said transversal flexible members being secured to the flexible, elongated members to form a net of straps.

According to another embodiment, the invention relates to the side protection device defined hereinabove, wherein each flexible, elongated member and each transversal flexible member is made of polyester material or Nylon®.

According to another embodiment, the invention relates to the side protection device defined hereinabove, wherein the flexible, elongated members are 3 to 6 inches width and tensioned between the first post and the second post at about 300 pounds.

According to another embodiment, the invention relates to the side protection device defined hereinabove, wherein the vehicle is an industrial truck, a bus or a semi-trailer.

According to another embodiment, the invention relates to the side protection device defined hereinabove, wherein when the vehicle is a bus, it further comprises a clip for fastening the upper portion of a flexible, elongated member to the body of the bus.

According to another embodiment, the invention relates to the side protection device defined hereinabove, wherein the net of straps is provided with eyelets allowing to suspend the same on a cable positioned between the first post and the second post.

According to another embodiment, the invention relates to the side protection device defined hereinabove, wherein the set of straps is further covered by a curtain of textile material to thus define an aerodynamic skirt underneath the vehicle.

According to another embodiment, the invention relates to the side protection device defined hereinabove, wherein it is to be secured on one of the lateral sides of a vehicle.

According to another embodiment, the invention relates to the side protection device defined hereinabove, wherein a pair of side protection devices which are a mirror image from each other, are to be secured on both lateral sides of the vehicle.

According to another embodiment, the invention relates to the pair of side protection devices as defined hereinabove, wherein said pair of side protection devices further comprise:

between the first post of each side protection device, at least one third reinforcement brace having a first end and a second end; at least one fastener securing the first end of the at least one third reinforcement brace with third band of the one of the first post, and at least one fastener securing the second end of the at least one third reinforcement brace with the third band of the other first post; and between the second post of each side protection device, at least one fourth reinforcement brace having a first end and a second end; at least one fastener securing the first end of the at least one fourth reinforcement brace with third band of the one of the second post, and at least one fastener securing the second end of the at least one fourth reinforcement brace with the third band of the other second post.

According to another embodiment, the invention relates to the pair of side protection devices as defined hereinabove, wherein said pair of side protection devices further comprise:

between the first post of each side protection device, at least one third reinforcement brace having a first end and a second end, the first end being provided with means adapted to be engaged by at least one fastener and the second end being provided with means adapted to be engaged by at least one fastener; at least one fastener engaging the means of the first end of the at least one third reinforcement brace and the means of the third band of the one of the first posts for securing the first end of the at least one third reinforcement brace with the third band of the one of the first posts; and at least one fastener engaging the means of the second end of the at least one third reinforcement brace and the means of the third band of the other first post for securing the second end of the at least one third reinforcement brace with the third band of the other of the first posts; and between the second post of each side protection device, at least one fourth reinforcement brace having a first end and a second end, the first end being provided with means adapted to be engaged by at least one fastener; and the second end being provided with means adapted to be engaged by at least one fastener; at least one fastener engaging the means of the first end of the at least one fourth reinforcement brace and the means of the third band of the one of the second posts for securing the first end of the at least one fourth reinforcement brace with the third band of the one of the second posts, and at least one fastener engaging the means of the second end of the at least one fourth reinforcement brace and the means of the third band of the other second post for securing the second end of the at least one fourth reinforcement brace with the third band of the other of the second posts.

Another embodiment, the invention relates to a vehicle comprising structural elements, a front end and a rear end, the rear end being provided with a rear set of wheels of the vehicle, said vehicle being provided with at least one side protection device as defined hereinabove.

Another embodiment, the invention relates to a vehicle comprising structural elements, a front end and a rear end, the rear end being provided with a rear set of wheels of the vehicle, said vehicle being provided on each lateral side, with a side protection device as defined hereinabove.

Another embodiment, the invention relates to a kit for mounting a side protection device to a vehicle comprising structural elements, a front end and a rear end, the rear end being provided with a rear set of wheels of the vehicle, for preventing road user to slip, move and/or enter under the vehicle, said kit comprising:

a first member adapted to be secured, under a lateral side of the vehicle, to the structural elements, said first member extending downwardly close of the rear of a front wheel or close a cabin of said vehicle, or close of a location where a rear portion of a rear set of wheels of a tractor unit is to be positioned when coupled to said vehicle;

a second member adapted to be secured, under a same lateral side of the vehicle, to said structural elements, said second member extending downwardly close and ahead a front portion of the rear set of wheels of the vehicle, at least one flexible, elongated member having a first end and a second end opposite to the first end;

at least one connecting means for securing the first end of the at least one flexible, elongated member to the first member or the second member, preferably the first member; and at least one connecting/tensioning means for securing and tensioning the at least one flexible, elongated member between the first member and the second member.

According to another embodiment, the kit defined hereinabove further comprises a notice of instruction.

According to another embodiment, the invention relates to the kit defined hereinabove, wherein the first member comprises:

a first post provided with a top end, a bottom end and an outer surface; a first band secured or integral with the outer surface of the first post and extending between the top end and the bottom end of the post, preferably from the top end to the bottom end of the first post; a second band secured or integral with the outer surface of the first post and extending between the top end and the bottom end of the post, preferably from the top end to the bottom end of the first post; and a top plate secured or integral with the top end of the first post;

a first reinforcing member provided with a top end; a rear end; a front end; a first band secured or integral with the top end; and a second band secured or integral with the rear end;

a second reinforcing member provided with a top end; a rear end; a front end; a first band secured or integral with the top end; and a second band secured or integral with the front end;

at least one fastener for securing the top plate with at least one of the structural elements of the vehicle;

at least one fastener for securing the first band of the first reinforcing member with at least one of the structural elements of the vehicle;

at least one fastener for securing the first band of the second reinforcing member with at least one of the structural elements of the vehicle;

at least one fastener for securing the first band of the first post with the second band of the first reinforcing member; and at least one fastener for securing the second band of the first post with the second band of the second reinforcing member.

According to another embodiment, the invention relates to the kit defined hereinabove, wherein the first post further comprises a third band secured or integral with the outer surface of the post and extending near the bottom end of the first post;

at least one first reinforcement brace having a first end and a second end;

at least one fastener for securing the third band with the first end of the at least one first reinforcement brace; and at least one fastener for securing the second end of the at least one first reinforcement brace with at least one of the structural elements of the vehicle.

According to another embodiment, the invention relates to the kit defined hereinabove, wherein the second member comprises:

a second post provided with a top end; a bottom end; an outer surface; a first band secured or integral with the outer surface of the second post and extending between the top end and the bottom end of the second post, preferably from the top end to the bottom end of the second post; a second band secured or integral with the outer surface of the second post and extending between the top end and the bottom end of the second post, preferably from the top end to the bottom end of the second post; and a top plate secured or integral with the top end of the second post;

a third reinforcing member provided with a top end; a rear end; a front end; a first band secured or integral with the top end; and a second band secured or integral with the rear end;

at least one fastener for the fastening of the top plate with at least one of the structural elements of the vehicle;

at least one fastener for securing the first band of the third reinforcing member with at least one of the structural elements of the vehicle; and at least one fastener for securing the first band of the first post with the second band of the third reinforcing member.

According to another embodiment, the invention relates to the kit defined hereinabove, wherein the second post further comprises a third band secured or integral with the outer surface of the second post;

at least one second reinforcement brace having a first end and a second end;

at least one fastener for securing the third band with the first end of the at least one second reinforcement brace; and at least one fastener for securing the second end of the at least one second reinforcement brace with at least one of the structural elements of the vehicle.

According to another embodiment, the invention relates to the kit defined hereinabove, wherein the first member comprises:

a first post provided with:
  a top end, a bottom end and an outer surface;
  a first band secured or integral with the outer surface of the first post and extending between the top end and the bottom end of the post, preferably from the top end to the bottom end of the first post, the first band being provided with means adapted to be engaged by at least one fastener;
  a second band secured or integral with the outer surface of the first post and extending between the top end and the bottom end of the post, preferably from the top end to the bottom end of the first post, the second band being provided with means adapted to be engaged by at least one fastener; and
  a top plate secured or integral with the top end of the first post and provided with means adapted to be engaged by at least one fastener;

a first reinforcing member provided with:
  a top end, a rear end and a front end;
  a first band secured or integral with the top end and provided with means adapted to be engaged by at least one fastener; and a second band secured or integral with the rear end and provided with means adapted to be engaged by at least one fastener;

a second reinforcing member provided with:

a top end, a rear end and a front end;

a first band secured or integral with the top end and provided with means adapted to be engaged by at least one fastener;

a second band secured or integral with the front end and provided with means adapted to be engaged by at least one fastener;

at least one fastener for engaging the means of the top plate adapted for receiving the at least one fastener, and engagement with at least one of the structural elements of the vehicle, for the securing of the top plate with the at least one of the structural elements of the vehicle;

at least one fastener for engaging the means of the first band of the first reinforcing member, said means being adapted to be engaged by the at least one fastener, and engaging at least one of the structural elements of the vehicle, for the securing of the first band of the first reinforcing member with the at least one of the structural elements of the vehicle;

at least one fastener for engaging the means of the first band of the second reinforcing member, said means being adapted to be engaged by the at least one fastener, and engaging at least one of the structural elements of the vehicle, for the securing of the first band of the second reinforcing member with the at least one of the structural elements of the vehicle;

at least one fastener for engaging the means of the first band of the first post, said means being adapted to be engaged by the at least one fastener, and engaging the means of the second band of the first reinforcing member, said means being adapted to be engaged by the at least one fastener, for the securing of the first band of the first post with the second band of the first reinforcing member; and at least one fastener for engaging the means of the second band of the first post, said means being adapted to be engaged by the at least one fastener, and engaging the means of the second band of the second reinforcing member, said means being adapted to be engaged by the at least one fastener, for the securing of the second band of the first post with the second band of the second reinforcing member.

According to another embodiment, the invention relates to the kit defined hereinabove, wherein the first post further comprises a third band secured or integral with the outer surface of the post and extending near the bottom end of the first post, said third band being provided with means adapted to be engaged by at least one fastener;

at least one first reinforcement brace having a first end and a second end, the first end being provided with means adapted to be engaged by at least one fastener; and the second end being provided with means adapted to be engaged by at least one fastener;

at least one fastener for engaging the means of the third band, said means being adapted to be engaged by the at least one fastener, and engaging the means of the first end of the at least one first reinforcement brace, said means being adapted to be engaged by the at least one fastener, for the securing of the third band with the first end of the at least one first reinforcement brace; and at least one fastener for engaging the means of the second end of the at least one first reinforcement brace, said means being adapted to be engaged by the at least one fastener, and engaging at least one of the structural elements of the vehicle, for the securing of the second end of the at least one first reinforcement brace with the at least one of the structural elements.

According to another embodiment, the invention relates to the kit defined hereinabove, wherein the second member comprises:

a second post provided with:

a top end, a bottom end and an outer surface;

a first band secured or integral with the outer surface of the second post and extending between the top end and the bottom end of the second post, preferably from the top end to the bottom end of the second post, the first band being provided with means adapted to be engaged by at least one fastener;

a second band secured or integral with the outer surface of the second post and extending between the top end and the bottom end of the second post, preferably from the top end to the bottom end of the second post, the second band being provided with means adapted to be engaged by at least one fastener; and a top plate secured or integral with the top end of the second post and provided with means adapted to be engaged by the at least one fastener;

a third reinforcing member provided with:

a top end, a rear end and a front end;

a first band secured or integral with the top end and provided with means adapted to be engaged by at least one fastener; and a second band secured or integral with the rear end and provided with means adapted to be engaged by at least one fastener;

at least one fastener for engaging the means of the top plate, said means being adapted to be engaged by the at least one fastener, and engaging at least one of the structural elements of the vehicle, for the securing of the top plate with the at least one of the structural elements of the vehicle;

at least one fastener for engaging the means of the first band of the third reinforcing member, said means being adapted to be engaged by the at least one fastener, and engaging at least one of the structural elements of the vehicle, for the securing of the first band of the third reinforcing member with the at least one of the structural elements of the vehicle;

at least one fastener for engaging the means of the first band of the second post, said means being adapted to be engaged by the at least one fastener, and engaging the means of the second band of the third reinforcing member, said means being adapted to be engaged by the at least one fastener, for securing the first band of the first post with the second band of the third reinforcing member.

According to another embodiment, the invention relates to the kit defined hereinabove, wherein the second post further comprises a third band secured or integral with the outer surface of the second post and extending near the bottom end of the second post, said third band being provided with means adapted to be engaged by at least one fastener;

at least one second reinforcement brace having a first end and a second end, the first end being provided with means adapted to be engaged by at least one fastener; and the second end being provided with means adapted to be engaged by at least one fastener;

at least one fastener for engaging the means of the third band, said means being adapted to be engaged by the at least one fastener, and engaging the means of the first end of the at least one second reinforcement brace, said means being adapted to be engaged by the at least one fastener, for securing the third band with the first end of the at least one second reinforcing brace; and at least one fastener for engaging the means of the second end of the at least one second reinforcement brace, said means being adapted to be engaged by the at least one fastener, and engaging at least one of the structural elements of the vehicle, for securing the second end of the at least one second reinforcement brace with the at least one of the structural elements of the vehicle.

According to another embodiment, the invention relates to the kit defined hereinabove, wherein it comprises:

from 2 to 4 flexible, elongated members, each flexible, elongated member having a first end and a second end opposite to the first end;

from 2 to 4 connecting means for connecting the first end of the at least one flexible, elongated member to the first member; and from 2 to 4 connecting/tensioning means for connecting and tensioning the at least one flexible, elongated member between the first member and the second member.

According to another embodiment, the invention relates to the kit defined hereinabove, wherein for each flexible, elongated member, the at least one connecting member is a two-part connector, one part of said two-part connector being mounted to the front end of the first reinforcing member and provided with a longitudinal cavity communicating with a longitudinal slot oriented toward the rear of the vehicle, the width of the slot being smaller than the transversal cross-section of the cavity;

the at least one connecting/tensioning means for connecting and tensioning the flexible, elongated member between the first member and the second member; is a tie-down winch comprising a frame, a winch drum provided with an opening, a ratchet wheel and a pawl, the base of said tie-down winch being secured to the second band of the reinforcing member of the second member; and the flexible, elongated member is a strap made of synthetic material having a high resistance to deformation and impact, the first end of the strap being provided with a portion defining the other part of said two-part connector, said portion being formed by a key element housed within a hem of the strap, and said key element being sized and shaped for longitudinal sliding within the cavity and transversal locking within said cavity.

According to another embodiment, the invention relates to the kit defined hereinabove, wherein for each flexible, elongated member, the at least one connecting member is a two-part connector comprising a first part and a second part, the first part of said connector being an opening oriented and size to receive the second part of said two-part connector;

the at least one connecting/tensioning means for connecting and tensioning the flexible, elongated member between the first member and the second member; is a tie-down winch comprising a frame, a winch drum provided with an opening, a ratchet wheel and a pawl, the base of said tie-down winch being secured to the second band of the reinforcing member of the second member; and the flexible, elongated member is a strap made of synthetic material having a high resistance to deformation and impact, the first end of the strap being provided with a portion provided with a hook element which is defining the second part of said two-part connector, said hook element being oriented and sized to engage the opening of the first part of the two-part connector.

According to another embodiment, the invention relates to the kit defined hereinabove, wherein further comprising a plurality of transversal flexible, members, said transversal flexible members being secured to the flexible, elongated members to form a net of straps.

According to another embodiment, the invention relates to the kit defined hereinabove, wherein each flexible, elongated member and each transversal flexible member is made of polyester material or Nylon®.

According to another embodiment, the invention relates to the kit defined hereinabove, wherein the flexible, elongated members are 3 to 6 inches width and tensioned between the first post and the second post at about 300 pounds.

According to another embodiment, the invention relates to the kit defined hereinabove, wherein the vehicle is an industrial truck, a bus or a semi-trailer.

According to another embodiment, the invention relates to the kit defined hereinabove, wherein when the vehicle is a bus, it further comprises a clip for fastening the upper portion of a flexible, elongated member to the body of the bus.

According to another embodiment, the invention relates to the kit defined hereinabove, wherein the net of straps is provided with eyelets allowing to suspend the same on a cable positioned between the first post and the second post.

According to another embodiment, the invention relates to the kit defined hereinabove, wherein the set of straps is further covered by a curtain of textile material to thus define an aerodynamic a skirt underneath the vehicle.

According to another embodiment, the invention relates to the kit defined hereinabove, wherein it is to be secured to on one of lateral sides of the vehicle.

According to another embodiment, the invention relates to the kit defined hereinabove, wherein a pair of side protection devices which are a mirror image from each other, are to be secured on both lateral sides of the vehicle.

According to another embodiment, the invention relates to the kit defined hereinabove, wherein said pair of side protection devices further comprise:

between the first post of each side protection device, at least one third reinforcement brace having a first end and a second end; at least one fastener securing the first end of the at least one third reinforcement brace with third band of the one of the first post, and at least one fastener for securing the second end of the at least one third reinforcement brace with the third band of the other first post; and between the second post of each side protection device, at least one fourth reinforcement brace having a first end and a second end; at least one fastener securing the first end of the at least one fourth reinforcement brace with third band of the one of the second post, and at least one fastener for securing the second end of the at least one fourth reinforcement brace with the third band of the other second post.

According to another embodiment, the invention relates to the kit defined hereinabove, wherein said pair of side protection devices further comprise:

- between the first post of each side protection device, at least one third reinforcement brace having a first end and a second end, the first end being provided with means adapted to be engaged by at least one fastener and the second end being provided with means adapted to be engaged by at least one fastener; at least one fastener for engaging the means of the first end of the at least one third reinforcement brace and the means of the third band of the one of the first posts for the securing of the first end of the at least one third reinforcement brace with the third band of the one of the first posts; and at least one fastener for engaging the means of the second end of the at least one third reinforcement brace and the means of the third band of the other first post for the securing of the second end of the at least one third reinforcement brace with the third band of the other of the first posts; and
- between the second post of each side protection device, at least one fourth reinforcement brace having a first end and a second end, the first end being provided with means adapted to be engaged by at least one fastener; and the second end being provided with means adapted to be engaged by at least one fastener; at least one fastener for engaging the means of the first end of the at least one fourth reinforcement brace and the means of the third band of the one of the second posts for the securing of the first end of the at least one fourth reinforcement brace with the third band of the one of the second posts, and at least one fastener for engaging the means of the second end of the at least one fourth reinforcement brace and the means of the third band of the other second post for the securing of the second end of the at least one fourth reinforcement brace with the third band of the other of the second posts.

According to another embodiment of the invention, the first post, the top plate, the first band of the first post, the second band of the first post and the third band of the first post are made of any appropriate material, preferably of metal such as aluminum and steel, more preferably of steel. Preferably, the top plate is secured to the top of the post and the first band of the first post and the second band of the first post are secured to the outer surface of the first post by any appropriate techniques well known to the skilled workman, more preferably by welding.

According to another embodiment of the invention, the first reinforcing member, the first band of the first reinforcing member, and the second band of the first reinforcing member are made of any appropriate material, preferably of metal such as aluminum and steel, more preferably of steel. Advantageously, the first reinforcing member may be obtained by securing the first band and the second band to a main portion of the first reinforcing member, by any appropriate techniques well known to the skilled workman, more preferably by welding. Much more preferably, the first band and the second band make an integral part of the reinforcing member, the first reinforcing member being obtained by mere bending of a sheet of metal.

According to another embodiment of the invention, the second reinforcing member, the first band of the second reinforcing member, and the second band of the second reinforcing member are made of any appropriate material, preferably of metal such as aluminum and steel, more preferably of steel. Advantageously, the second reinforcing member may be obtained by securing the first band and the second band to a main portion of the second reinforcing member, by any appropriate techniques well known to the skilled workman, more preferably by welding. Much more preferably, the first band and the second band make an integral part of the second reinforcing member, the second reinforcing member being obtained by mere bending of a sheet of metal.

According to another embodiment of the invention, the at least one fastener may consist of any type of fasteners well known to skilled workmen, preferably nails, screws, nut and bolt assemblies, clamp assemblies, etc. Preferably, they consist of nut and bolt assemblies or clamp assemblies comprising at least one nut and bolts assembly. The fasteners may be made of any appropriate materials preferably they are made of metal such as aluminum and steel, more preferably steel.

According to another embodiment of the invention, the second post, the top plate, the first band of the second post, the second band of the second post and the third band of the second post are made of any appropriate material, preferably of metal such as aluminum and steel, more preferably of steel. Preferably, the top plate is secured to the top of the second post, and the first band of the second post and the second band of the second post are secured to the outer surface of the second post by any appropriate techniques well known to the skilled workman, more preferably by welding.

According to another embodiment of the invention, the third reinforcing member, the first band of the third reinforcing member, and the second band of the third reinforcing member are made of any appropriate material, preferably of metal such as aluminum and steel, more preferably of steel. Advantageously, the third reinforcing member may be obtained by securing the first band and the second band to a main portion of the third reinforcing member, by any appropriate techniques well known to the skilled workman, more preferably by welding. Much more preferably, the first band and the second band make an integral part of the third reinforcing member, the third reinforcing member being obtained by mere bending of a sheet of metal.

According to another embodiment of the invention, the first reinforcement brace, the second reinforcement brace, the third reinforcement brace and the fourth reinforcement brace are made of any appropriate material, preferably of metal such as aluminum and steel, more preferably of steel. More preferably, they consist of an angle structure such as an iron-corner.

According to another embodiment of the invention, the two-part connectors may be of any type well known to skilled workman. It is made of appropriate material well know to skilled workmen, preferably of metallic parts such as aluminum or steel, more preferably steel. Two-part connectors defined hereinafter in the detailed description of the invention, are particularly preferred because they show surprising advantages to make the invention simple, easy to use and reliable.

According to another embodiment of the invention, the tie-down winch is of the type currently available in the industry and the do not need to be explained in detail. It is made of appropriate material well know to skilled workmen, preferably of metallic parts such as aluminum or steel, more preferably steel.

According to another embodiment of the invention, means adapted to be engaged by at least one fastener may consist of openings and/or of edges of a «I» beam.

BRIEF DESCRIPTION OF THE DRAWINGS

The present invention will be better understood with reference to the following drawings:

FIG. 3 represents a side elevational view of a preferred embodiment of a first post defining a part of the first member;

FIG. 4 represents a top plan view of a preferred embodiment of a post defining a part of the first member of FIG. 3;

FIG. 5 represents a side elevational view of a preferred embodiment of a first reinforcing member which is part of the first member;

FIG. 6 represents a top plan view of a preferred embodiment of the first reinforcing member of FIG. 5;

FIG. 7 represents a side elevational view of a preferred embodiment of a second reinforcing member which is part of the first member;

FIG. 8 represents a top plan view of a preferred embodiment of the second reinforcing member of FIG. 7;

FIG. 25 represents an illustration of a preferred embodiment of the second post;

FIG. 26 represents an illustration of a preferred embodiment of the top plate of the second post of FIG. 25;

FIG. 27 represents an illustration of a preferred embodiment of the third reinforcing member of the second post;

FIG. 28 represents an illustration of a top plan view of a preferred embodiment of the third reinforcing member of FIG. 27;

FIG. 45 represents an illustration according to line XLV-XLV in FIG. 43;

FIG. 46 represents an illustration of a preferred embodiment of a flexible, elongated member provided with a hook portion;

FIG. 47 represents an illustration of the hook portion of FIG. 46;

FIG. 48 represents an illustration of a preferred embodiment for securing the hook portion with the flexible, elongated member of FIG. 46;

FIG. 50 represents an illustration of details of the connection between flexible, elongated members and transversals members, and means for suspending the net on a cable;

FIG. 51 represents an illustration of the net of FIG. 50 further covered with a fabric to define an aerodynamic skirt;

FIG. 53a represents an enlargement of a part of FIG. 53;

FIG. 56 represents a preferred embodiment for securing one end of a cable to the second member; and FIG. 57 represents a preferred embodiment for securing the other end of the cable to the first member.

DETAILED DESCRIPTION OF PREFERRED EMBODIMENTS OF THE INVENTION

Figure 1:
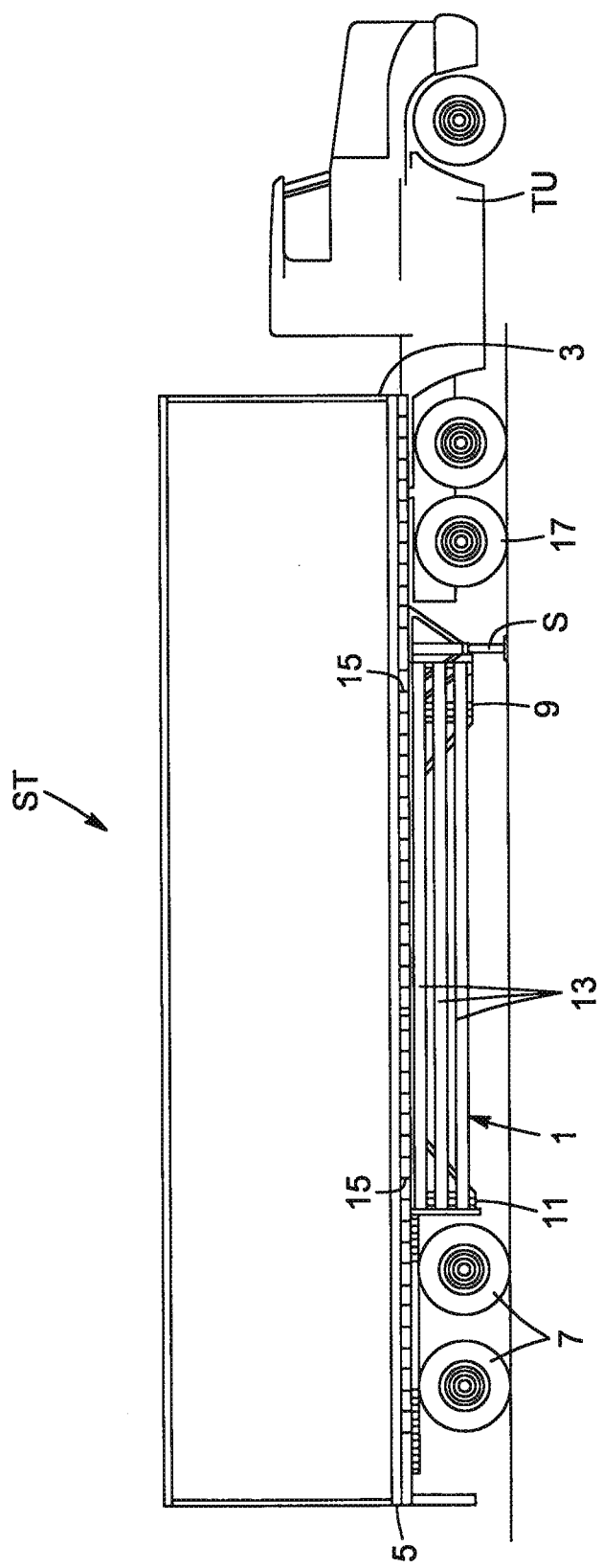
FIG. 1 represents a side elevational view of a semi-trailer (coupled to a tractor unit) provided with a preferred embodiment of a side protection device according to the invention.

FIG. 1 represents a side elevational view of a semi-trailer ST provided with a side protection device 1 on one of its side. Of course, only one side protection device 1 is illustrated. However, preferably, there is a side protection device 1 on both sides of the semi-trailer ST. The side protection device on the other side of the vehicle is a mirror image of the side protection device 1 illustrated in FIG. 1.

The semi-trailer ST comprises conventional structural elements including a front end 3, a rear end 5 and a set of rear wheels 7, and each of the side protection device 1 (i.e. one device on both sides of the semi-trailer ST) is provided with a first member 9, a second member 11 and straps 13 each defining a flexible, elongated member. Also, the semi-trailer is further provided with a stand S. This stand S is a standard part of semi-trailer and does not need to be further defined.

More particularly, as illustrated in FIG. 1, the first member 9 is extending downwardly close of a location where a rear portion of a rear set of wheels 17 of a tractor unit TU is to be positioned when coupled to the semi-trailer ST.

Figure 2:
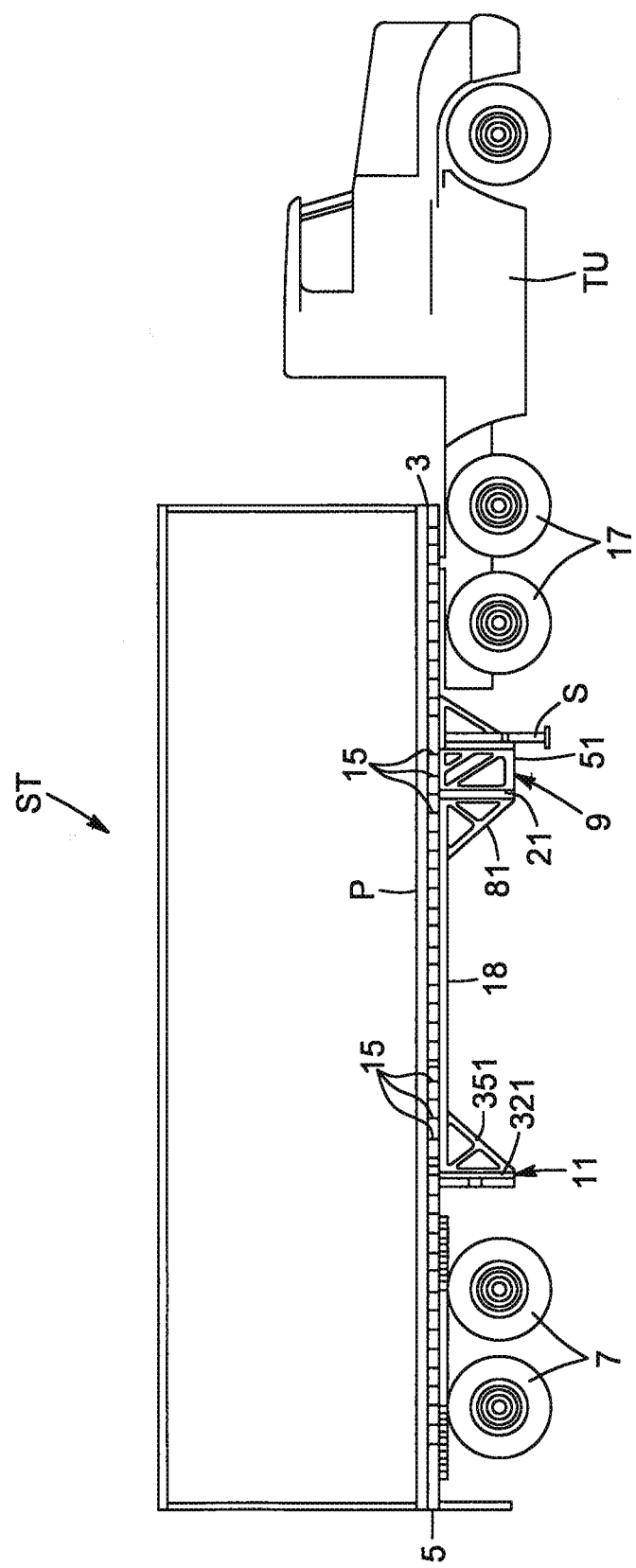
FIG. 2 represents a side elevational view of the semi-trailer of FIG. 1 showing the first member and the second member of the preferred embodiment of the side protection device according to the invention.

With reference to FIG. 2, the first member 9 is mounted under a lateral side of the vehicle, to structural elements comprising a plurality of parallel «I» beams 15. Said «I» beams are extending transversely to the length of the trailer defined between the front end 3 and the rear end 5. Such «I» beams are common part of the platform P of the semi-trailer ST and do not need to be further exemplified.

With reference to FIG. 2, the first member 9 comprises a first post 21, a first reinforcing member 51, a second reinforcing member 81 and fasteners for securing the first post 21, the first reinforcing member 51 and the second reinforcing member 81 together and with corresponding «I» beams 15 of the semi-trailer ST.

Figure 9:
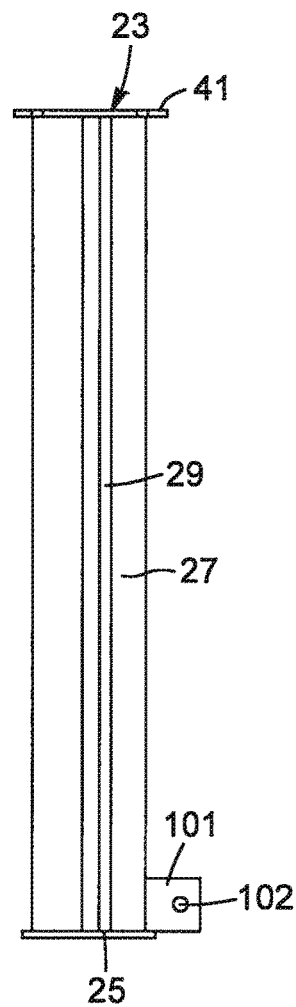
FIG. 9 represents a side elevational view of a preferred embodiment of the post defining part of the first member.

With reference to FIGS. 3, 4 and 9, the first post 21 is provided with a top end 23, a bottom end 25, an outer surface 27; a first band 29 secured to (e.g. welded) the outer surface 27 and extending from the top end 23 to the bottom end 25, the first band 29 being provided with openings 30 which are part of means adapted to be engaged by fasteners; a second band 35 secured to (e.g. welded) the outer surface 27 and extending from the top end 23 to the bottom end 25, the second band 35 being provided with opening 36 which are part of means adapted to be engaged by; and a top plate 41 integral of the top end 25 and provided with openings 42 which are part of means adapted to be engaged by fasteners for securing said top plate 41 to corresponding «I» beams 15.

Preferably, the first post 21 is a tube of steel (30 5/16 inches length, 4 inches diameter, and a wall thickness of 3/16 inch), the first band 29 and the second band 35 are each made of a band of steel having 1¼ inch by 30 5/16 inches, and the top plate 41 is a plate made of steel (size in inches: 3/16 inch thick by 5½ inches by 5½ inches).

The first post 21 is optionally further provided with a third band 101 which is a small plate of steel (size 3/16 inch thick by 2 inches by 2 inches). Also, as illustrated, optionally a bottom plate 121 made of steel (size in inches: 3/16×5½×5½) can be provided at the bottom of the first post 21.

According to a particularly preferred embodiment, the first band 29, the second band 35, the top plate 41 and the optional third band 101 are secured to the first post 21 by welding according to techniques well known to skilled workmen. Openings 30, 36, 42 and 102 have a diameter of about ½ inch.

With reference to FIGS. 5 and 6, the first reinforcing member 51 is provided with a top end 53, a rear end 55, a front end 57, a first band 59 integral of the top end 53 and provided with openings 62 which are part of means adapted to be engaged by fasteners for securing said first band 59 to corresponding «I» beam 15; and a second band 65 integrally projecting from the rear end 55 and provided with opening 68 which are part of means adapted to be engaged by fasteners for securing said second band 65 to the first band 29. Also, the reinforcing member 51 may be optionally is provided with triangular openings 52 to reduce the weight of said first reinforcing member 51, and openings 54 which are intended to receive a corresponding hook 707 of a strap 13 (see FIG. 46). Also, as illustrated, openings 62 and 68 have a diameter of about ½ inch.

The first reinforcing member 51 is preferably a plate of steel having a thickness of 3/16 inch, a length of 29 1/16 inches and a height of 30 5/16 inches. The first band 59 has a thickness of 3/16 inch, a length of 31 5/16 inches and a width of 3 inches. Preferably, the first band 59 forms an integral part of the first reinforcing member 51 and is obtained by bending of the plate of steel. Also, the second band 65 has a thickness of 3/16 inch, a height of 30 5/16 inches and a length of 2¼ inches. Preferably, the second band 65 is portion of the plate of steel forming the first reinforcing member 51.

With referenced to FIGS. 7 and 8, the second reinforcing member 81 is provided with a top end 83, a rear end 85, a front end 87, a first band 89 forming an integral part of the top end 83 and provided with openings 92 which are part of means adapted to be engaged by fasteners for securing the said first band 89 to corresponding «I» beams 15 of the semi-trailer ST; a second band 95 integrally projecting from the front end 87 and provided with openings 98 which are part of means adapted to be engaged by fasteners for securing the said second band 95 to the second flat band 35 of the first post 21. Also, preferably, the reinforcing member 81 may be optionally provided with triangular opening 82 to reduce the weight of said reinforcing member 81. Also, openings 92 and 98 have a diameter of about ½ inch.

The second reinforcing member 81 is preferably a plate of steel having a thickness of 3/16 inch, a length of 30⅜ inches and a height of 30 5/16 inches. The first band 89 has a thickness of 3/16 inch, a length of 33⅞ inches and a width of 3 inches. The second band 95 has a thickness of 3/16 inch, a length of 33⅞ inches and a width of 3 inches. Preferably, the first band 89 forms an integral part of the second reinforcing member 81 and is obtained by bending of the plate of steel. Also, the second band 65 has a thickness of 3/16 inch, a height of 30 5/16 inches and a length of 2¼ inches. Preferably, the second band 95 is portion of the plate of steel forming the second reinforcing member 81.

Figure 10:
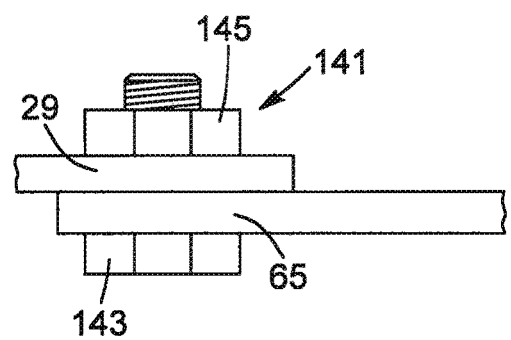
FIG. 10 represents a partial illustration of a preferred embodiment for the securing the first post with the first reinforcing member.

The second band 65 of the first reinforcing member 51 is secured to the first band 29 of the post 21 with a plurality of nut and bolt assemblies 141 (see FIG. 10). More particularly, a bolt 143 engages each pair of openings 30 and 68, and secures the first band 29 and the second band 65 together by screwing of the nut 145 on the bolt 143. Each of said openings 30 and 68 have a diameter of ½ inch.

Figure 11:
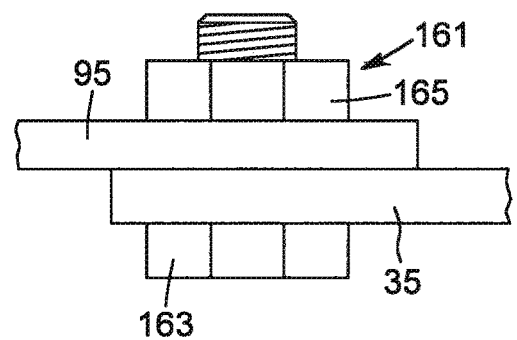
FIG. 11 represents a partial illustration of a preferred embodiment for the securing of the first post with the second reinforcing member.

The second band 95 of the reinforcing member 81 is fastened to the second band 35 of the post 21 with a plurality of nut and bolt assemblies 161 (see FIG. 11). More particularly a bolt 163 engages a pair of openings 36 and 98, and secures the second band 95 and the second band 35 together by screwing of the nut 165 on the bolt 163. Each of said openings 36 and 98 has a diameter of ½ inch.

Figure 13:
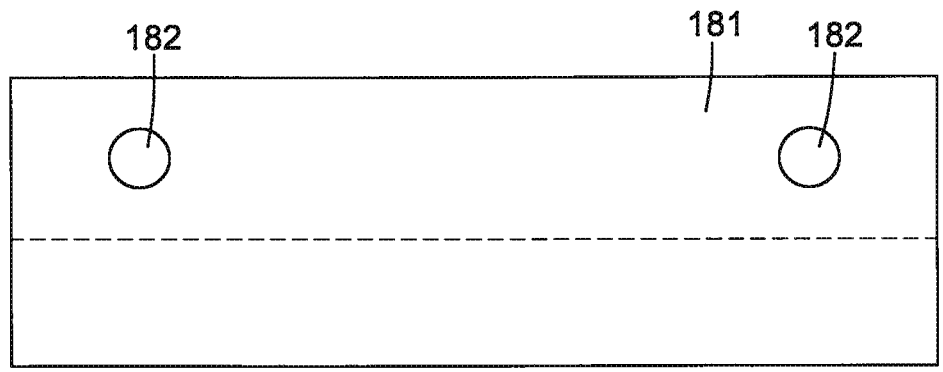
FIG. 13 represents a top plane view of a plate useful for securing the top plate of the first post to the «I» beam as illustrated in FIG. 12.
Figure 14:
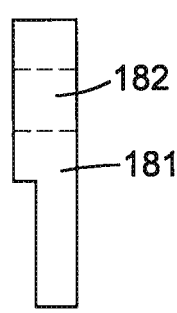
FIG. 14 represents an end view of the plate of FIG. 13.
Figure 12:
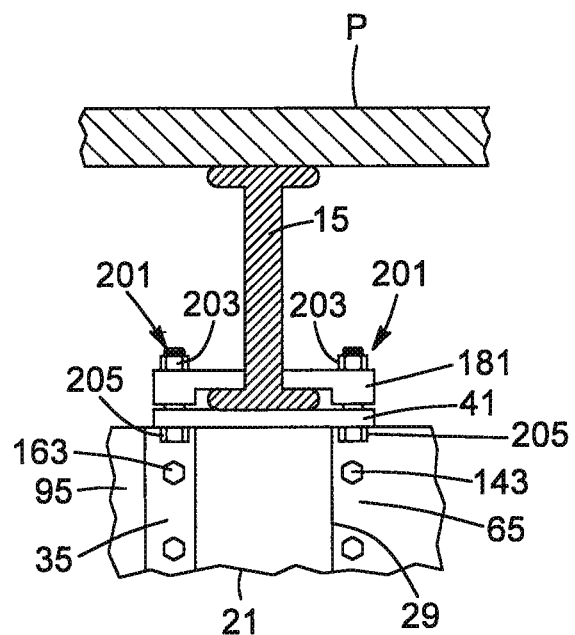
FIG. 12 represents a partial illustration of a preferred embodiment for the securing of the top plate of the first post to a «I» beam defining one of the structural element of the vehicle.

The top plate 41 is connected to corresponding «I» beams 15 with a pair of connecting plates 181 (see FIGS. 13 and 14) each provided with two openings 182. As illustrated in FIGS. 12 to 14, a nut and bolt assembly 201 engages each pair of openings 44 and 182 and upon screwing of nuts 203 on bolts 205, clamps the top plate 41 against a portion of a corresponding «I» beam 15.

Figure 15:
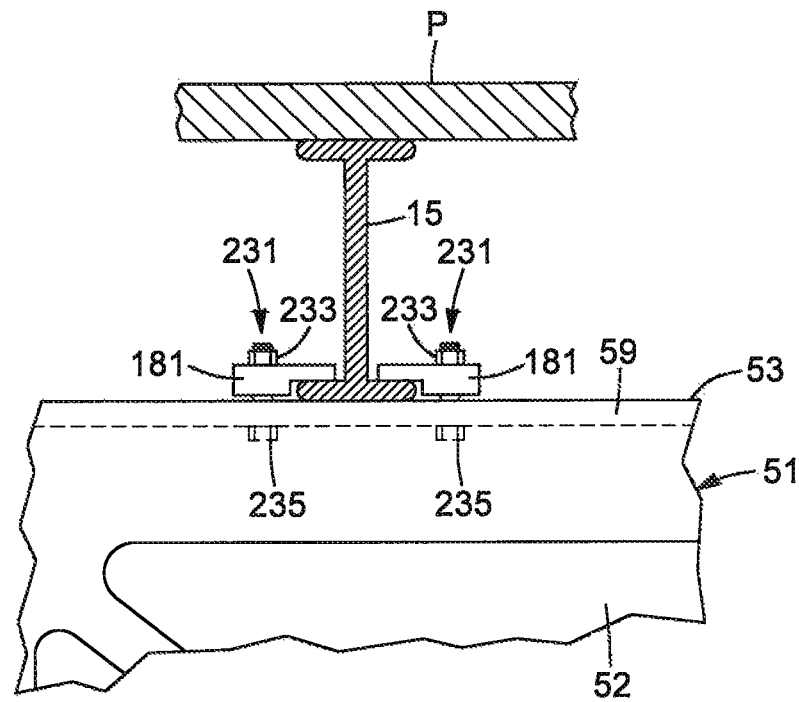
FIG. 15 represents an illustration of a preferred embodiment for the securing of a first reinforcing member to a «I» beam defining of the structural element of the vehicle.

Similarly, the first band 59 is connected to corresponding «I» beams 15 with connecting plates 181 provided with two openings 182. As illustrated in FIG. 15, a nut and bolt assembly 231 engages each pair of openings 62 and 182 and upon screwing of nuts 233 on bolts 235, secures (i.e. clamps) the first band 59 against a portion of a corresponding «I» beam 15.

Figure 16:
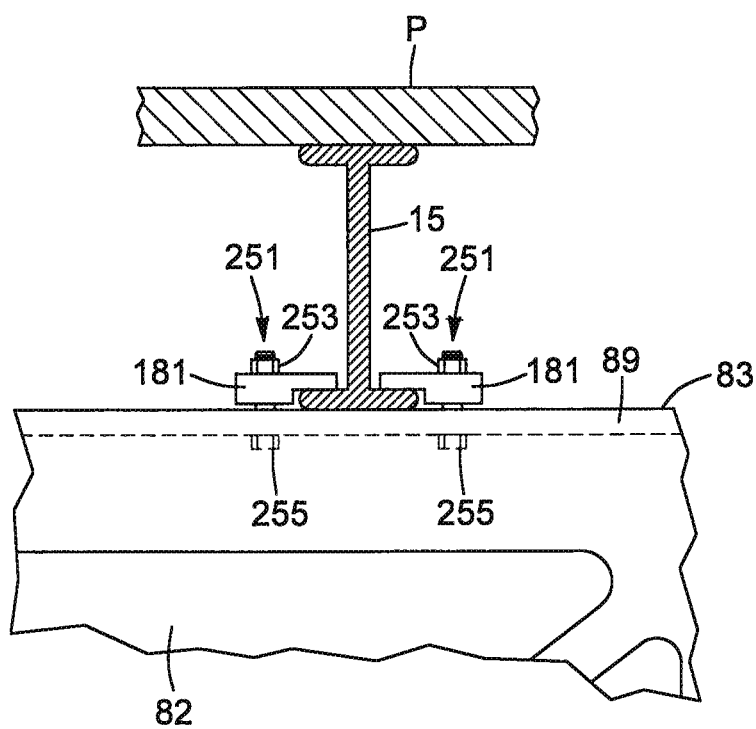
FIG. 16 represents an illustration of a preferred embodiment for the securing of a second reinforcing member to a «I» beam.
Figure 17:
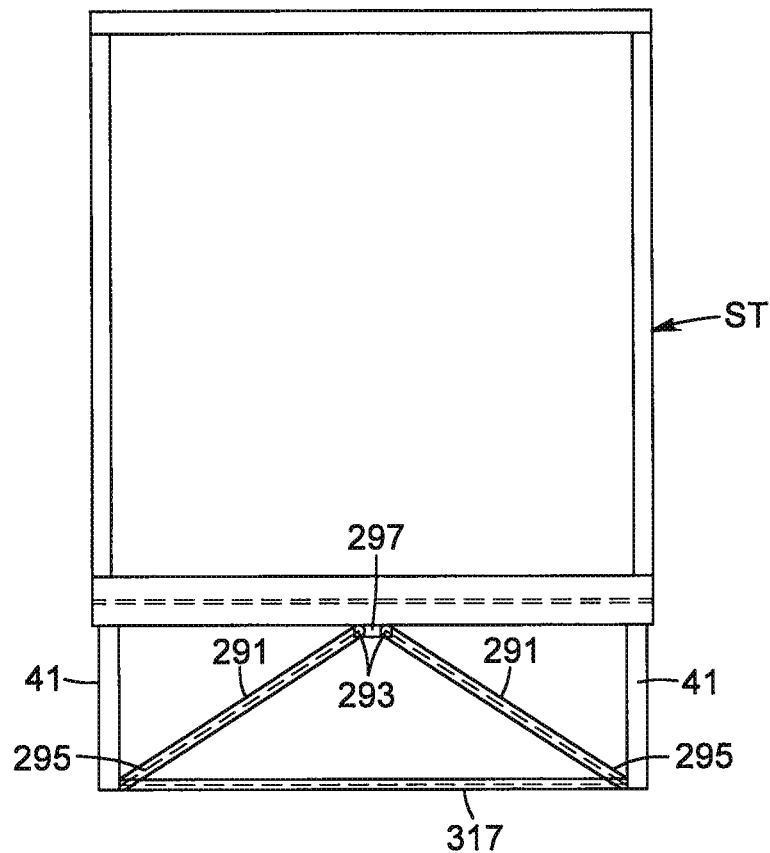
FIG. 17 represents an illustration of first reinforcement braces for connecting first posts with a «I» beam defining one of the structural elements of the vehicle.

Similarly, the first band 89 is connected to corresponding «I» beams 15 with connecting plates 181 provided with two openings 182. As illustrated in FIG. 16, a nut and bolt assembly 251 engages each pair of openings 92 and 182 and upon screwing of nuts 253 on bolts 255, secures (i.e. clamps) the first band 89 against a portion of a corresponding «I» beam 15.

Each plate 181 is made of a plate of steel having 5½ inches by 1⅝ inch and a thickness of ¼ inch in the thin portion and ⅜ inch in the thick portion where openings 182 are provided. Each of said openings 182 has diameter of ½ inch.

Figure 18:
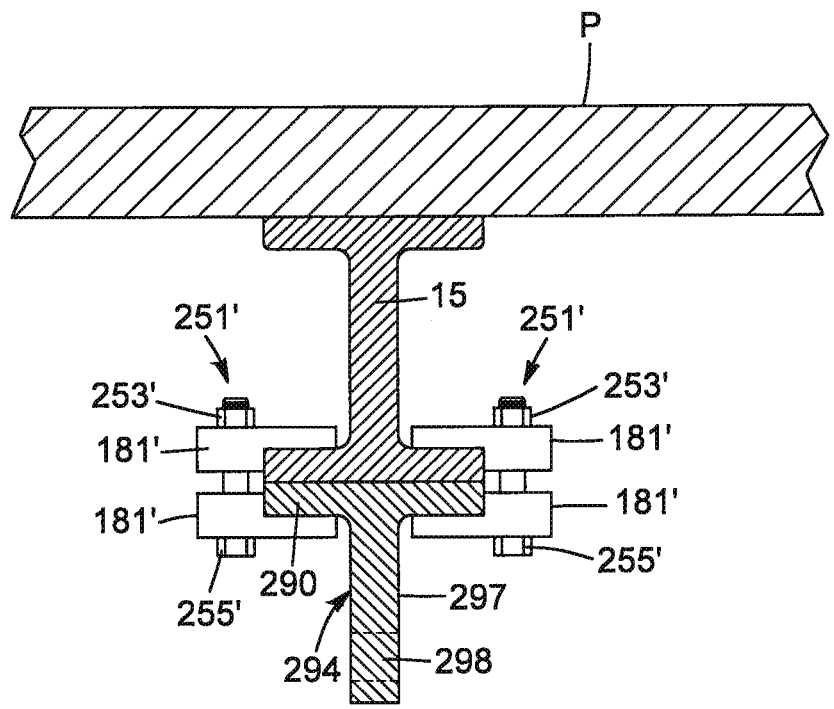
FIG. 18 represents an illustration of a preferred embodiment for the securing of a «T» plate with a «I» beam and securing the first reinforcement brace with the «T» plate.
Figure 24:
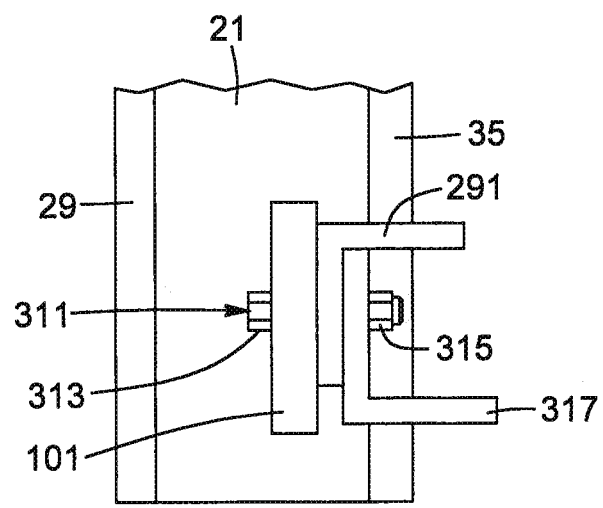
FIG. 24 represents an illustration according to line XXIV-XXIV in FIG. 22.
Figure 20:
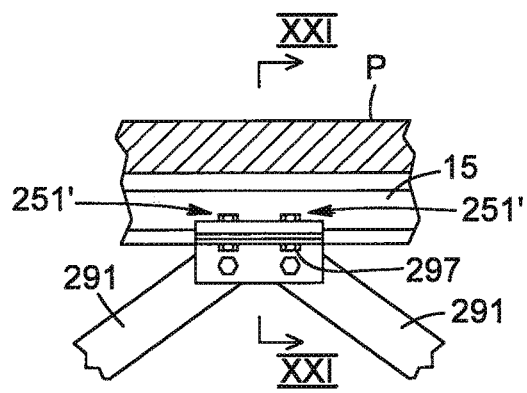
FIG. 20 represents an illustration of a preferred embodiment for the securing first braces to a «T» plate.
Figure 21:
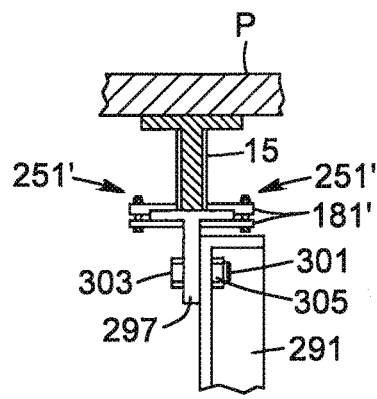
FIG. 21 represents a partial illustration of FIG. 20 according to line XXI-XXI.
Figure 22:
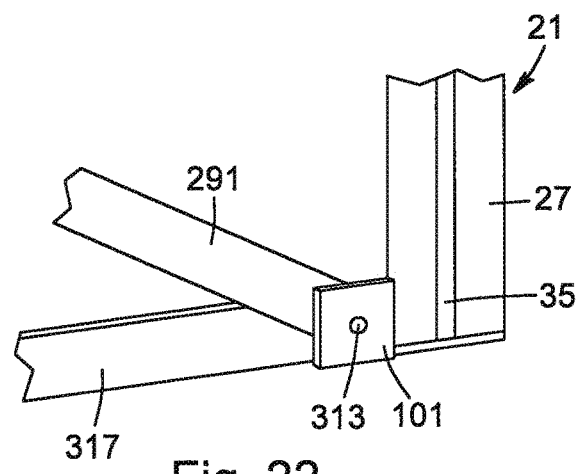
FIG. 22 represents an illustration of a preferred embodiment for the securing of the first reinforcement brace and the third reinforcement brace to a third band of the first post.

Optionally, when a side protection device 1 is mounted on both sides of the semi-trailer ST, said devices further comprises as illustrated in FIGS. 9 and 17 to 24, with first reinforcement braces 291. Each first reinforcement brace 291 is provided with a first end 293 and a second end 295. The first end 293 is provided an opening 292; the second end 195 is provided with opening 296. Also, a plate 297 is secured to a corresponding «I» beam 15 by any appropriate means and provided with a pair of openings 298 (see FIG. 18). Each of said openings 292, 296 and 298 has a diameter of about ½ inch. Preferably, the plate 297 is part of an element 294 having a T-shaped cross-section as illustrated in FIG. 18. The upper portion 292 of the element 294 is secured to a «I»-beam 15 with four connecting plates 181', identical to connecting plates 181 defined before, fastened by pair together. To do so, as illustrated in FIG. 18, a nut and bolt assembly 251' engages each pair of openings 182 and upon screwing of nuts 253' on bolts 255', secures (i.e. clamps) the upper portion 290 against a portion of a corresponding «I» beam 15.

Figure 19:
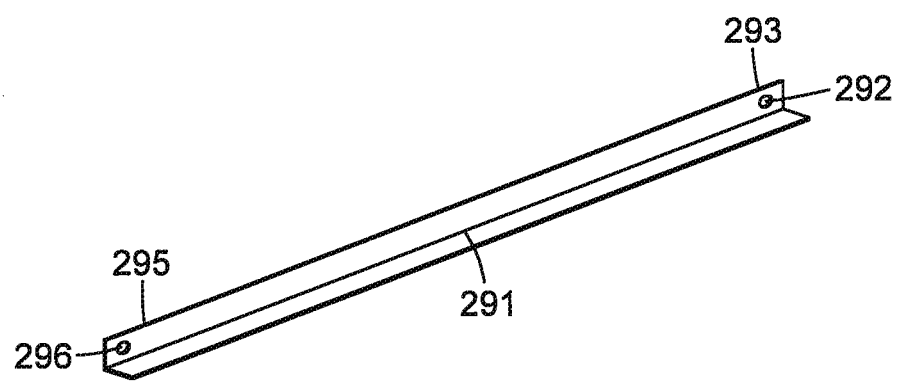
FIG. 19 represents an illustration of a first reinforcement brace.

As illustrated in FIG. 19, each brace 291 has a L-shaped cross-section. According to a preferred embodiment, the opening 292 and one of the openings 198 is engaged by a nut and bolt assembly 301 comprising a bolt 303 and a nut 305. The bolt 303 engages openings 292 and 298, and the nut 305 is screwed on the bolt 303 to secure the first end 293 to the plate 297, while the opening 296 and the opening 102 of the third band 101 is engaged by a nut and bolt assembly 311 comprising a bolt 313 and a nut 315. The nut 315 is screwed on the bolt 313 to secure the second end 195 with the third end 101.

Figure 23:
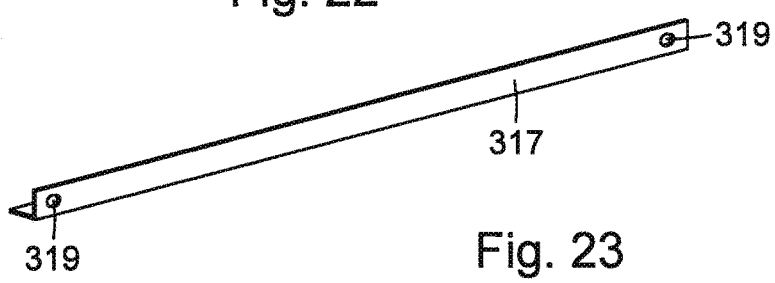
FIG. 23 represents an illustration of a third reinforcement brace.
Figure 29:
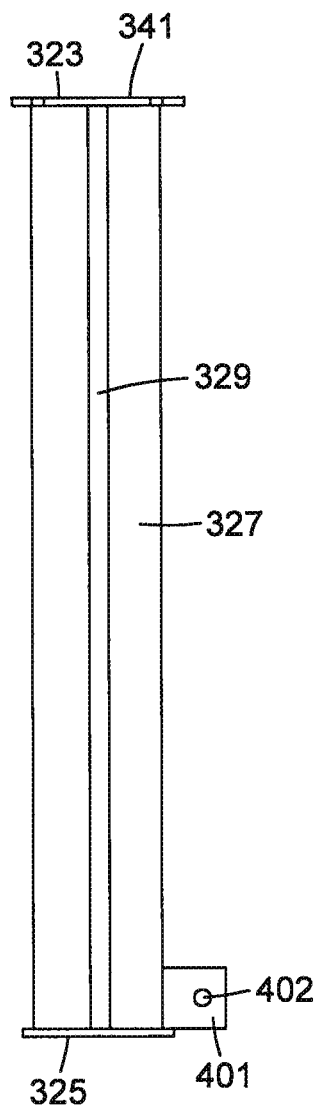
FIG. 29 represents an illustration of a side elevational view of a preferred embodiment of the second post of FIG. 25.

Optionally, the third reinforcement brace 317 is provided. This brace 317 is provided with a pair of opposite ends 319. Each end 319 is provided an opening 321. Each of said opening 321 is optionally engaged by the bolt 313 connecting the openings 196 and 102 of a corresponding first post 41. As illustrated in FIG. 23, each brace 317 has a L-shaped cross-section.

More particularly, as illustrated in FIG. 2, the second member 11 is extending downwardly close and ahead a front portion of the rear set of wheels 7. This second member 11 comprises a second post 321, and a third reinforcing member 351.

Figure 33:
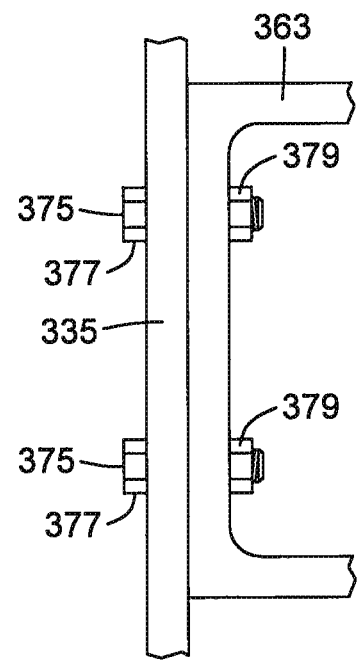
FIG. 33 represents a preferred embodiment for securing the base of the tie-down winch to the second band of the second post of FIG. 24.
Figure 30:
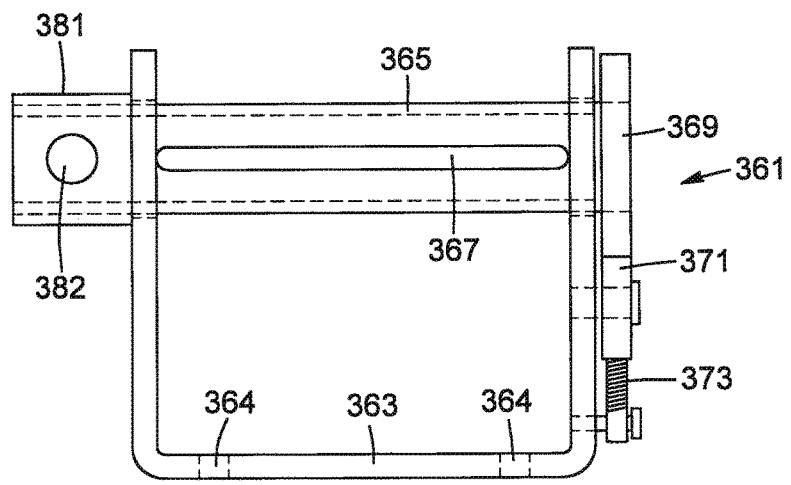
FIG. 30 represents a side elevational view of a preferred embodiment of a tie-down winch.
Figures 31, 32:
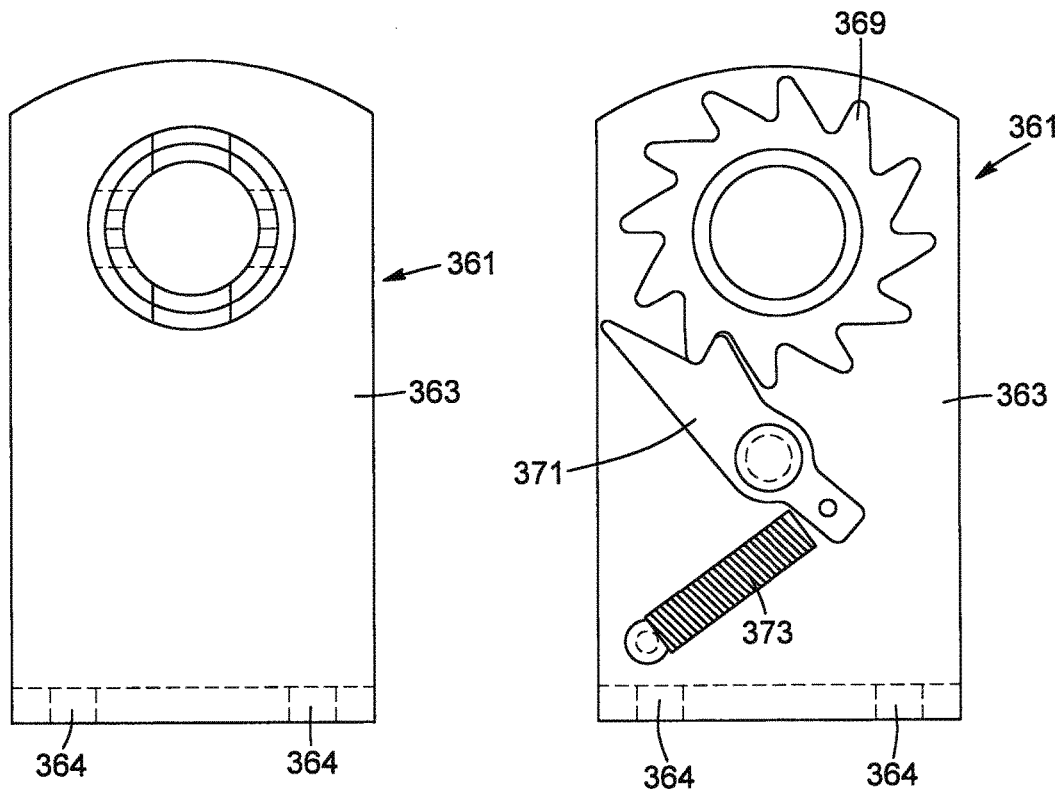
FIG. 31 represents a end elevational view of the tie-down winch of FIG. 30.
FIG. 32 represents another end elevational view of the tie-down winch of the FIG. 30 illustrating the ratchet wheel.

With reference to FIGS. 25 to 28, the second post 321 is provided with a top end 323, a bottom end 325 and an outer surface 327; a first band 329 secured to (e.g. welded) which forms an integral part of the outer surface 327 and extends from the top end 323 to the bottom end 325, the first band 329 being provided with opening 330 which are part of means adapted to be engaged by fasteners; a second band 335 secured to (e.g. welded) the outer surface 327 and extends from the top end 323 to the bottom end 325, the second band 335 being provided with openings 336 and adapted for receiving the base of a tie-down winch 340 (see FIG. 33); and a top plate 341 secured to (e.g. welded) the top end 325 and provided with openings 344 which are part of means adapted to be engaged by fasteners for securing said top plate 341 to corresponding «I» beams 15. Openings 330, 336 and 344 each have a diameter of about ½ inch.

The second post 321 is preferably a tube of steel (30 5/16 inches by 4 inches diameter and a wall thickness 3/16 inch), the first band 329 is made of a band of steel having 1¼ inch by 30 5/16 inches and a thickness of 3/16 inch, the second band 335, and the top plate 341 is a plate made of steel (3/16 inch×5½ inches×5½ inches). The second post 321 is optionally further provided with a third band 401 which is a small plate of steel (size 3/16 inch thick by 2 inches by 2 inches). The third band 401 is further provided with an opening 402. The opening 402 has a diameter of about % inch.

According to a particularly preferred embodiment, the first band 329, the second band 335, the top plate 341 and the optional third band 401 and/or the bottom plate 321 are secured to the second post 321 by welding according to techniques well known to skilled workmen.

The third reinforcing member 351 is similar to the second reinforcing member 81 except it is a mirror image of said member 81. Thus the reinforcing member 351 is provided with a top end 383, a rear end 385, a front end 387, a first band 389 integral of the top end 383 and provided with openings 392 which are part of means adapted to be engaged by fasteners and securing the said first band 389 to corresponding «I» beams 15 of the semi-trailer ST; a second band 395 integral projecting from the front end 387 and provided with opening 398 which are part of means adapted to be engaged by fasteners and securing the said second band 395 to the second flat band 335 of the second post 321. Also, preferably, the third reinforcing member 351 may be optionally provided with triangular opening 382 to reduce the weight of said reinforcing member 351. Preferably, the securing of the second band 385 of the third reinforcing member 351 to the band 329 of the second post 321, is similar to the one achieved for securing of the second band 95 of the reinforcing member 81 to the second band 35 of the post 21 (i.e. with a plurality of nut and bolt assemblies 161 (see FIG. 11)).

The third reinforcing member 351 is preferably a plate of steel having a thickness of 3/16 inch, a length of 30 3/8 inches and a height of 30 5/16 inches. The first band 389 has a thickness of 3/16 inch, a length of 33 7/8 inches and a width of 3 inches. Each of said openings 392 and 398 has a diameter of about 1/2 inch.

Preferably, the first band 389 forms an integral part of the second reinforcing member 351 and is obtained by bending of the plate of steel. Also, the second band 395 has a thickness of 3/16 inch, a height of 30 5/16 inches and a length of 2 1/4 inches. Preferably, the second band 395 is portion of the plate of steel forming the second reinforcing member 351.

The second band 335 is made of a plate of steel having a thickness of 3/16 inch bent to have a L-shaped cross section and provided with reinforcement element 337 in order to define 3 housings 339, each for receiving a winch device 340. The short branch of the L is 2 1/2 inches while the long branch is 5 1/2 inches.

With reference to FIGS. 30 to 34, the winch device 340 is a tie-down winch 361 comprising a U-shaped base 363 provided with a winch drum 365 rotatably mounted on the U-shaped base 363 and provided with an opening 367 (for receiving portion of the strap 13), a ratchet wheel 369 and a pawl 371 cooperating with a spring 373. The base 363 is provided with four openings 364. The base of the drum is mounted on the second band 335 with nut and bolt assemblies 375. More particularly, with reference to FIG. 33, each pair of opening 336 and opening 364 is engaged by a bolt 377, and the based is secured to the second band 335 by screwing a nut 379 on the bolt 377. Also, the tie-down winch 361 is further provide with an element 381 having opening 382 to be engaged by a lever (not shown) to rotate the winch drum 365. It is to be noted that said tie-down winch is well known to skilled person and does need to be further defined.

Figure 34:
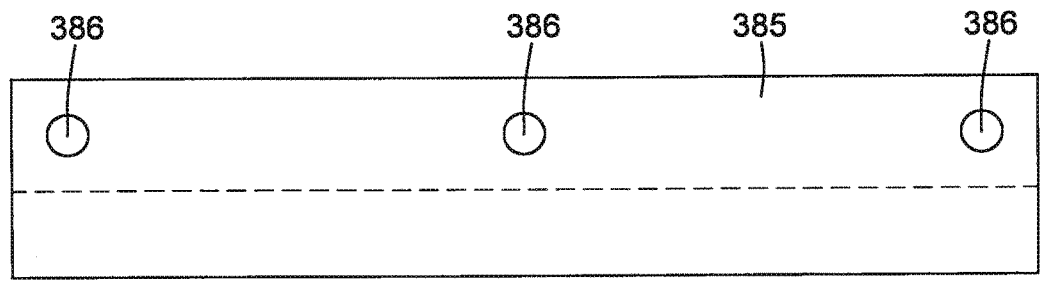
FIG. 34 represents an illustration of a top plan view of a plate for securing the top plate of the second post of FIG. 24 to a «I» beams.
Figure 35:
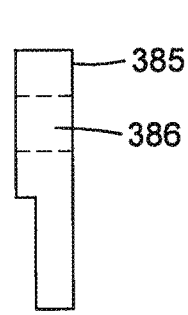
FIG. 35 represents an illustration of a end elevational view of the plate of FIG. 34.
Figure 36:
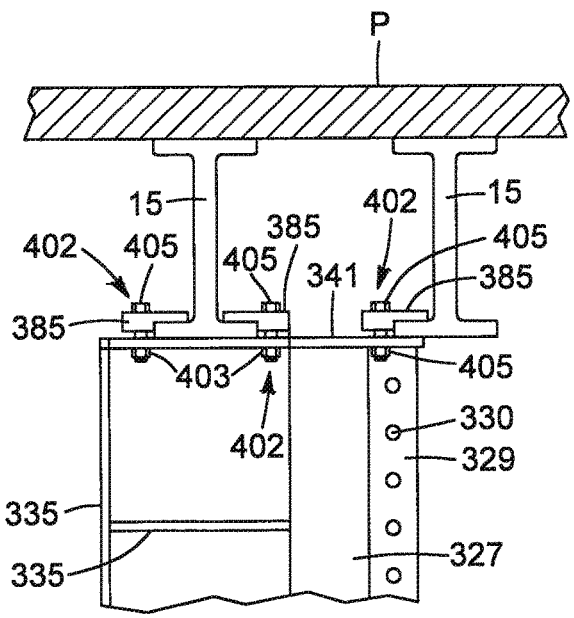
FIG. 36 represents an illustration of a preferred embodiment for securing the second post of FIG. 24 to «I» beams.

The top plate 341 is connected to corresponding «I» beams with connecting plates 385 provided with opening 386. As illustrated in FIGS. 34 to 36, a nut and bolt assembly 402 engages each pair of opening 342 and 386 and upon screwing of nuts 403 on bolts 405, secures (i.e. clamps) the top plate 341 against a portion of a corresponding «I» beams 15.

Figure 37:
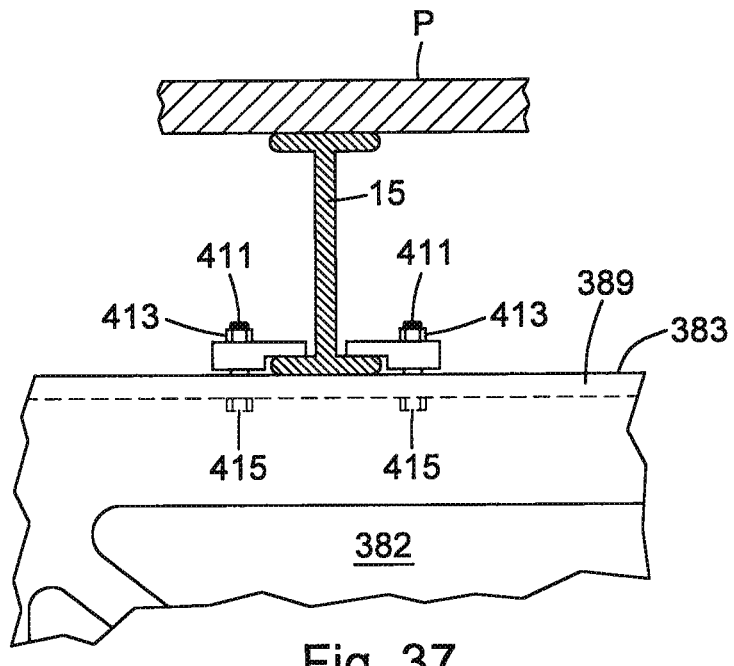
FIG. 37 represents an illustration of a preferred embodiment for securing the third reinforcing member to a «I» beam.

Similarly, the first band 389 is secured to corresponding «I» beams 15 with connecting plates 181 provided with two openings 182 (see FIGS. 13 and 14). As illustrated in FIG. 37, a nut and bolt assembly 411 engages each pair of openings 392 and 182 and upon screwing of nuts 413 on bolts 415, secures (i.e. clamps) the first band 389 against a portion of a corresponding «I» beam 15.

Each plate 181 is made of a plate of steel having 5 1/2 inches by 1 5/8 inch and a thickness of 1/4 inch in the thin portion and 3/8 inch in the thick portion where openings 182 are provided. Each of said openings 182 has diameter of 1/2 inch.

Figure 39:
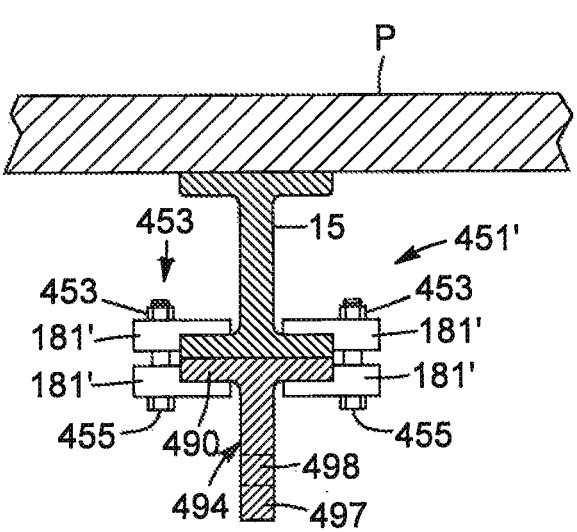
FIG. 39 represents an illustration of a preferred embodiment using a «T» plate for securing second reinforcement brace to a «I» beam.
Figure 40:
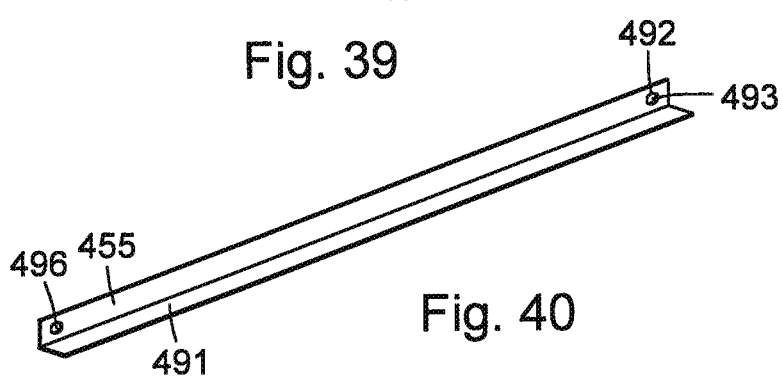
FIG. 40 represents an illustration of a preferred embodiment the second reinforcement brace.
Figure 38:
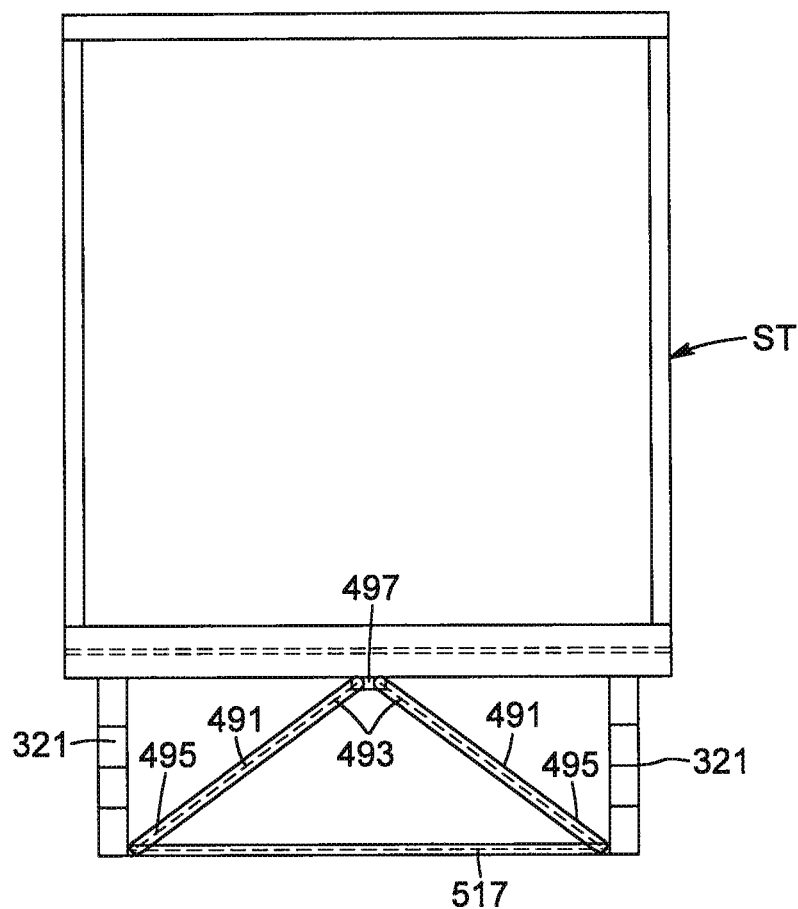
FIG. 38 represents an illustration of a preferred embodiment where a fourth reinforcement brace.
Figure 41:
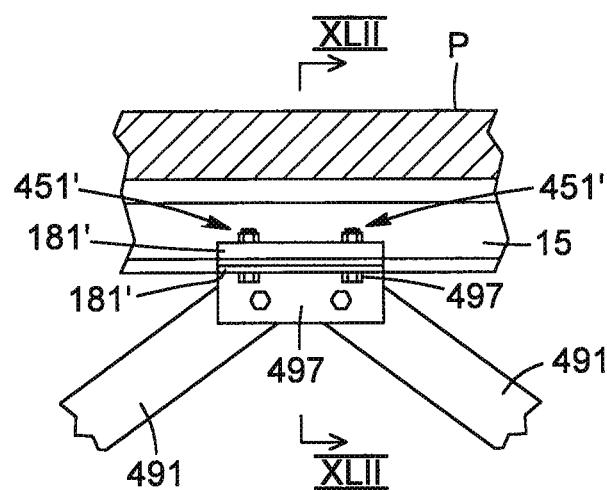
FIG. 41 represents an illustration of a preferred embodiment for securing second reinforcement braces with the «T» plate.
Figure 42:
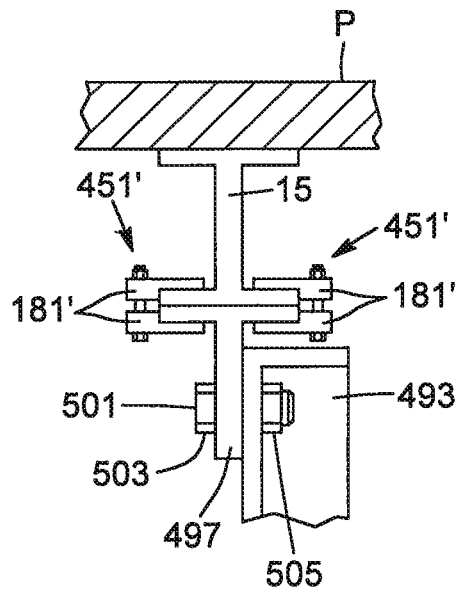
FIG. 42 represents an illustration according to line XLII-XLII of FIG. 41.
Figure 43:
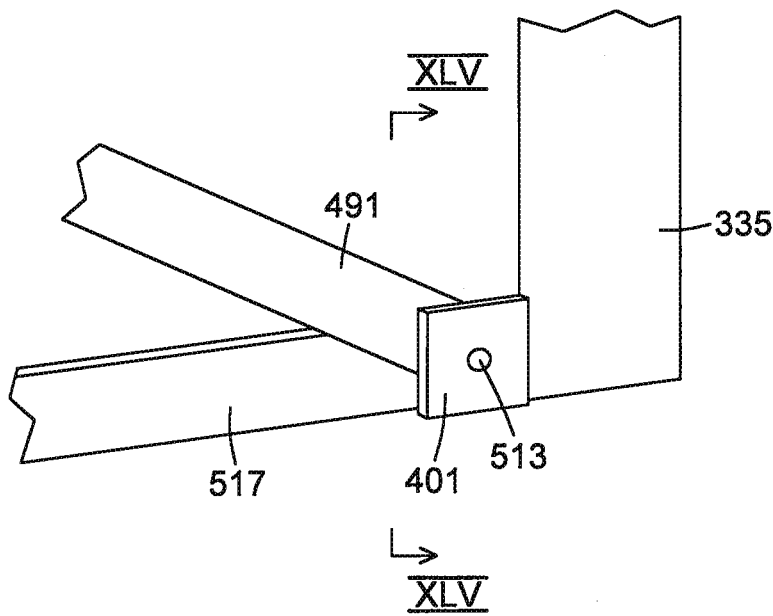
FIG. 43 represents an illustration of a preferred embodiment for securing a second reinforcement brace and a fourth reinforcement brace to a third band of the second post of FIG. 24.

Optionally, when a side protection device 1 is mounted on both sides of the semi-trailer ST, said devices further comprises as illustrated in FIGS. 38 to 45, with second reinforcement braces 491. Each second reinforcement brace 491 is provided with a first end 493 and a second end 495. The first end 493 is provided an opening 492; the second end 495 is provided with opening 496. Also, a plate 497 secured to a corresponding «I» beam 15 by any appropriate means and provided with a pair of openings 498. Each of said openings 492, 496 and 498 has a diameter of 1/2 inch. Preferably, the plate 497 is part of an element 494 having a T-shaped cross-section as illustrated in FIG. 39. The upper portion 492 of the element 494 is secured to the «I» beam with four connecting plates 181', identical to connecting plates 181 defined before, fastened by pair together. To do so, as illustrated in FIG. 39, a nut and bolt assembly 451' engages each pair of openings 182 and upon screwing of nuts 453' on bolts 455', secures (i.e. clamps) the upper portion 490 against a portion of a corresponding «I» beam 15. As illustrated in FIG. 40, each second reinforcement 491 has a L-shaped cross-section.

According to a preferred embodiment, the opening 492 and one of the openings 498 is engaged by a nut and bolt assembly 501 comprising a bolt 503 and a nut 505. The bolt 503 engages openings 492 and 498, and the nut 505 is screwed on the bolt 503 to secure the first end 493 to the plate 497, while the opening 496 and the opening 402 of the third band 401 are engaged by a nut and bolt assembly 511 comprising a bolt 513 and a nut 515. The nut 515 is screwed on the bolt 513 to secure the second end 495 with the third end 401.

Figure 44:
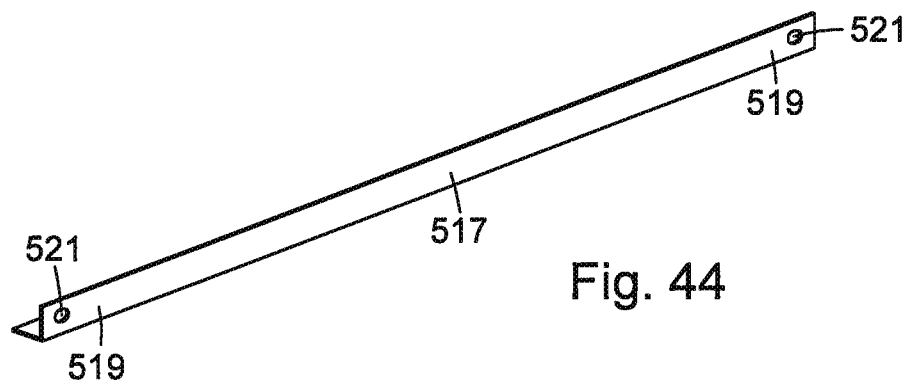
FIG. 44 represents an illustration of a preferred embodiment of a fourth reinforcement brace.

Optionally, the fourth reinforcement brace 517 is provided. This fourth reinforcement brace 517 is provided with a pair of opposite ends 519. Each end 519 is provided an opening 521. Each of said opening 521 is optionally engaged by the bolt 513 which is also engaging the openings 496 and 402 of a corresponding second post 321. As illustrated in FIG. 44, each brace 491 has a L-shaped cross-section.

At least one, preferably from 2 to 4, more preferably with reference to FIG. 1, three flexible, elongated members 13 are provided. With reference to FIGS. 46 to 48, each flexible, elongated member 13 has a first end 703 and a second end 705. The first end 703 is provided with a hook 707 having an opening 711 and a hooking portion 713. More particularly, the first end 703 forms a loop 709 engaging an opening 711 of the hook 707, and the hooking portion 713 is intended to engage opening 54 (see FIG. 5). The second end 705 is intended to engage a tie-down winch 361 mounted on the second band 335. The first end 703 is fastened to the flexible, elongated ember 13 with stitches 715. Preferably stiches made with Nylon threads.

Each flexible, elongated member 13 is tensioned between the first member 9 and the second member 11 by engaging the hooking portion 713 in the opening 54, and engaging the second end 705 in the opening 367 of the drum winch 365. Then by rotation of the drum winch 365, a portion of the flexible, elongated member 13 is rolld around the drum winch 365 and the flexible, elongated member is tensioned, preferably up to a tension of about 300 lbs.

Figure 55:
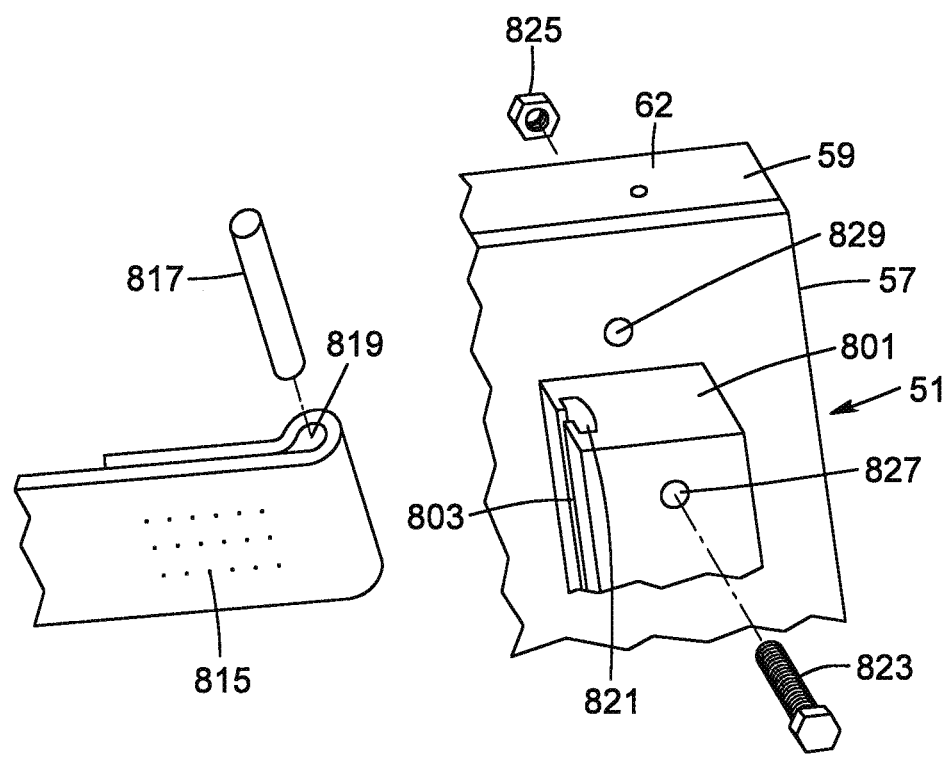
FIG. 55 represents a variant of a preferred embodiment for securing a flexible, elongated member to the first reinforcing member of the first member.
Figure 58:
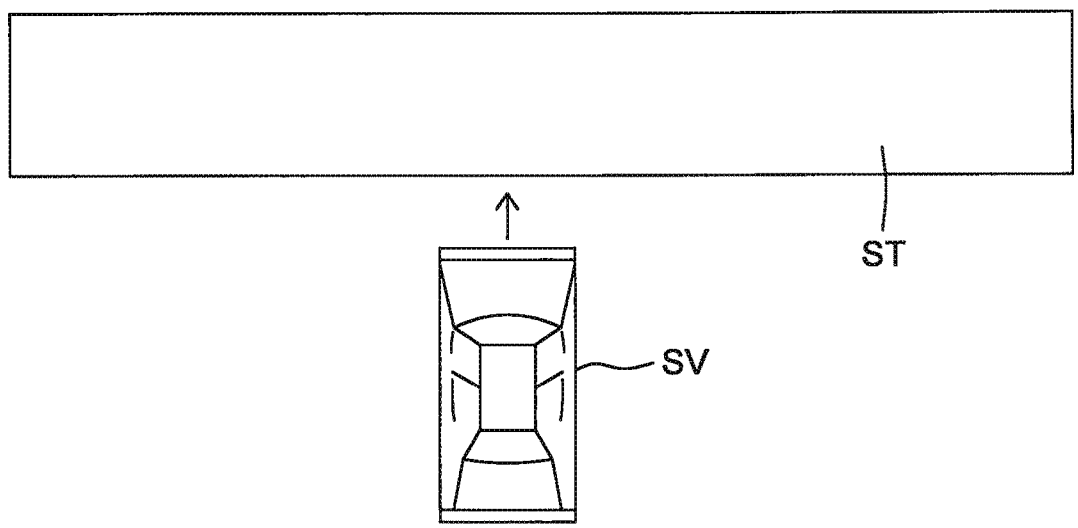
FIG. 58 represents a schematic lateral collision of a small vehicle with a semi-trailer as illustrated in FIG. 49.

Alternatively, as illustrated in FIG. 55, the two-part connector defined by the combination opening 54 and hook 707, can be replaced by a two part connector provided with one part mounted to the front end of the first reinforcing member 51 and provided with a member 801 having a longitudinal cavity 821 communicating with a longitudinal slot 803 oriented toward the rear of the vehicle, the width of the slot being smaller than the transversal cross-section of the cavity 821; and the flexible, elongated member 13 is a strap made of synthetic material having a high resistance to deformation and impact, the first end of the strap being provided with a portion defining the other part of said connector, said portion being formed by a key element 817 housed within a hem 819 of the strap 13, and said portion is sized and shaped for a longitudinal sliding within the cavity 821 and transversal locking within said cavity. The member 801 is fixed to member 51 with a plurality of nut and bolt assemblies each comprising a bolt 823 and a nut 825, engaging openings 827 and 829.

According to a preferred embodiment, the flexible, elongated member is a strap made of 100% polyester having a 3 inches width. Advantageously, each strap has a thickness of 3.75 mm and presents a weight of 26.22 kg/100 m, and an elongation of 4 to 5% when subjected to a tension of 300 lbs. Alternatively, other type of straps can be used. As an example, a strap of 100% Nylon® having a 3 inch width, a thickness of 4.42 mm an elongation of 14 to 16% under a 300 lbs tension, and a weight of 22.22 kg/100 m; or a strap of made of 100% polyester having a 6 inches width. a thickness of 3.75 mm, a weight of 21.8 kg/100 m, and an elongation of 4 to 5% when subjected to a tension of 300 lbs, or a strap made of 100% Nylon® having a 3-inch width, a thickness of 4.42 mm an elongation of 14 to 16% under a 300 lbs tension, and a weight of 48.01 kg/100 m.

Figure 49:
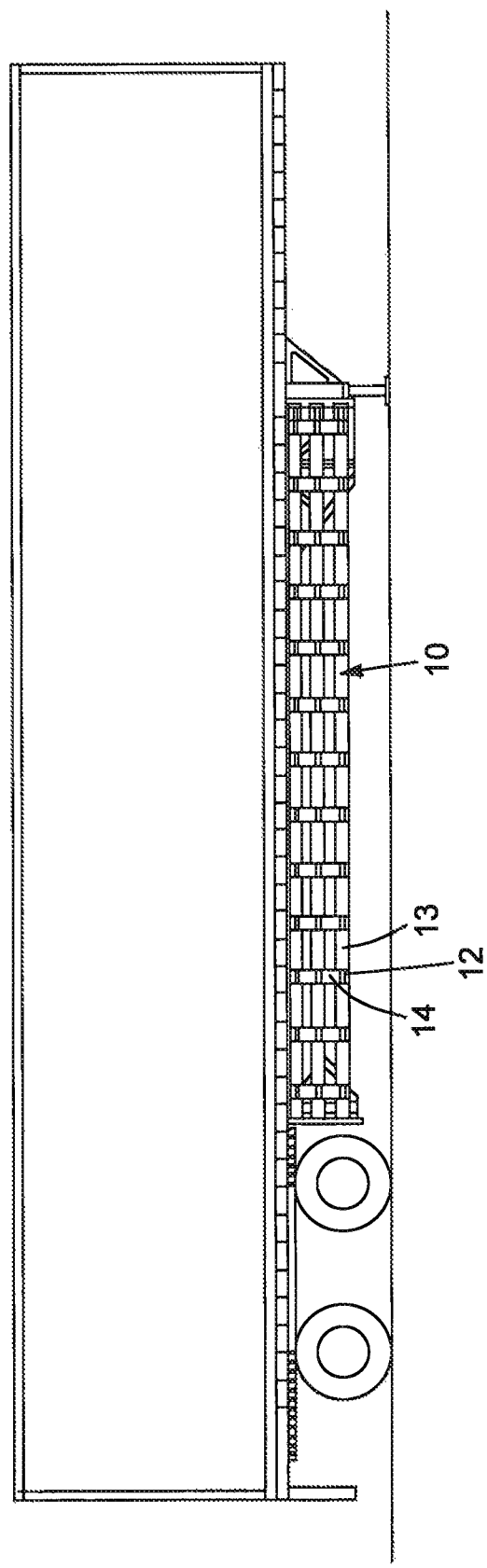
FIG. 49 represents an illustration of a preferred embodiment concerning a net comprising flexible, elongated members and transversals members.

Optionally, with reference to FIG. 49, when flexible, elongated members 13 are parallels straps, then advantageously, they can be connected together by short straps elements 14 to thereby form a net of straps 10. Short straps 14 and elongated members 13 are connected together with stiches 12 (see FIG. 50).

With reference to FIG. 51, according to another embodiment, the net 10 of straps 13 and short straps 14 can be covered by a fabric material 20 to thus define a skirt 22 having aerodynamic properties. Preferably, the fabric may be replaced by a sheet of vinyl material. The fabric material or the sheet of vinyl material may be fastened to the net 10 by any appropriate means. As an example, the fastening may be achieved with stiches of Nylon treads. Said stiches can be made with any industrial sewing tools well known to skilled workmen. Stiches and tools do not need to be defined in detail.

In use when a small vehicle (e.g. a car) hits the side protection device as illustrated in FIG. 49 according to FIG. 56, will prevent said small vehicle entering under the semi-trailer. More particularly, the net 10 made of straps 13 and 14 will be elastically deformed by the impact of the small vehicle to absorb the energy of the moving car and stop it.

It is known that to stop a one-ton car moving at 35 MPH, 190 KJ are necessary. It is to be note that one-ton car is generally designed to absorb 170 KJ in an accident. The net 10 made of straps 13 and 14 is designed to absorb about 1000 KJ before damaging the integrity of the net 10 and its structural members 9 and 11.

When moving at about 35 MPH a one-ton small vehicle (e.g. a car) toward a lateral side of an immobilized semi-trailer ST equipped with a side protection device as defined hereinabove, said small vehicle will not enter more than 18 inches under the semi-trailer to thus prevent contact of the cab of the small vehicle with the semi-trailer while reducing the violence of the impact of the front of the small vehicle because of the elastic deformation of the straps 13 and 14 (or depletion of the net of the side protection device).

EXAMPLES

Tests were carried out with a net 10 of the side protection device 1 mounted on a semi-trailer ST as illustrated in FIG. 49, except said net 10 was further covered with a sheet of vinyl material to further define a skirt providing aerodynamic properties. The sheet of vinyl material is fastened to the net by any appropriate means, in the following examples with stiches of Nylon threads. Also, the sheet of vinyl material does not have significant elastic properties to stop a vehicle. The presence of this fabric is essentially for aerodynamic purposes.

The members 9 and 11 as well as fasteners, hooks and winches are made of steel as defined according to the preferred embodiments mentioned hereinabove. The straps 13 are made of polyester material. Each strap has a thickness of 3.75 mm, a width of 4 inches, a weight of 78.74 kg/100 m and shows an elongation of 4 to 5% under a 300 pounds tension. Also, this strap has a capacity of 39200 lbs. Vertical straps 14 are made of polyester material. Each vertical strap has a width of 3 inches, has a thickness of 3.75, a weight of 26.22 kg/100 m. Also, this strap has a capacity of 29400 lbs. Straps 13 and 14 are secured together with stiches 12 made with Nylon threads. Stiches 12 are sewed with an industrial sewing machine according to techniques well known in the art. These techniques do not need to be explained in detail.

Example 1

Determination of the structural capacity of the net 10 when subjected to a lateral impact a 90° with respect to side protection device mounted on a semi-trailer.

Protocol

A bumper of a Ford F-150 vehicle was secured on a frame secured on a hydraulic cylinder having a 16.25 inches stroke. The hydraulic cylinder was secured between the forks of an 100 000 lbs industrial fork lift vehicle. There was no motion of the industrial fork vehicle lift during this test. Only the hydraulic cylinder was actuated. The semi-trailer ST weights 14007 lbs and was loaded with 61600 lbs of concrete blocks. Also, to prevent lateral displacement of the semi-trailer, the stand was resting on a rubber carpet and applied against a block of concrete weighting 4400 lbs. The bumper was set to move perpendicularly to the length of the semi-trailer, at about 24 inches from the ground and against the net 10 of the side protection device 1.

A CLWG-600 linear potentiometer was installed between a portion of a frame secured on a block of concrete weighting 4400 lbs and a portion of an arm pivotably mounted on said frame and provided with an end linked to the frame supporting the bumper. When the bumper was moved against the net 10, the arm was moved and the linear potentiometer was actuated proportionally. Also, the motion of the arm allows to determine the distance the bumper penetrates under the semi-trailer ST.

Figure 59:
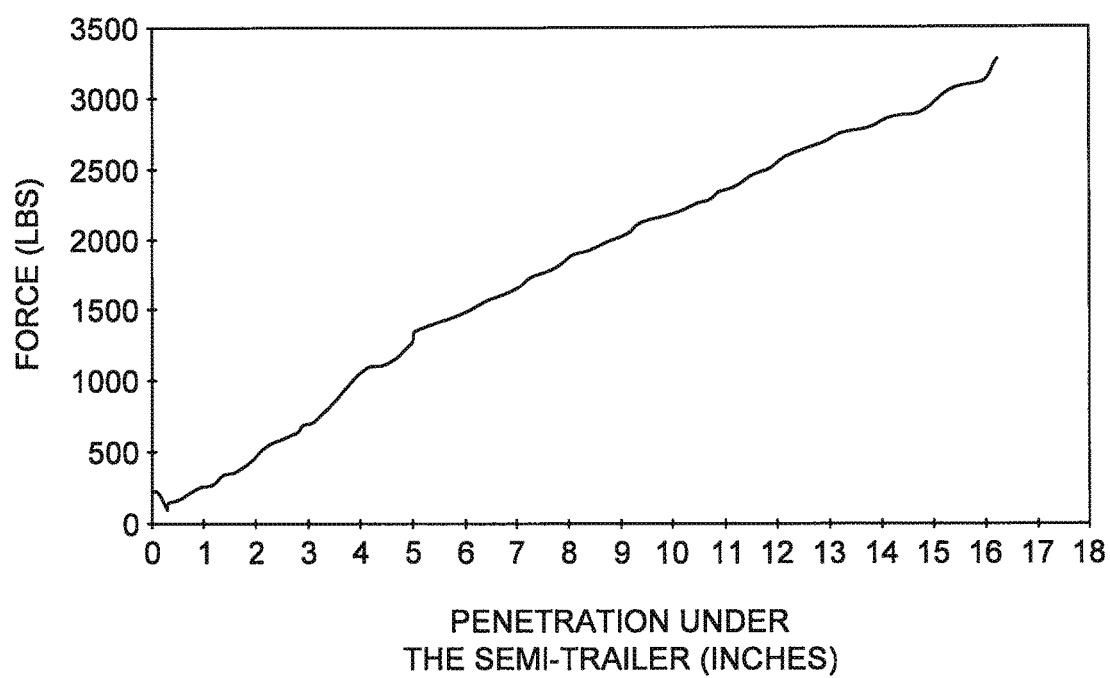
FIG. 59 represents a variation of the force applied to the net of a side protection device according to example 1.

Then the hydraulic cylinder was actuated to push the bumper against the net 10. A complete movement of the cylinder was obtained after 17.73 seconds. The force applied was reached 3276 lbs at the end of the stroke of the hydraulic cylinder to thus measure an energy absorption of 84441 Lb-ft (or 114.5 KJ). The variation of the force applied to the net 10 is illustrated in the graph of FIG. 59. Then the hydraulic cylinder was returned to its initial position and the net 10 and the members 9 and 11 as well as fasteners, hooks and winches, revealed to be substantially intact. Idem for the vinyl material covering the net 10.

Example 2

Determination of the maximal capacity of the side protection device 1 mentioned hereinabove to this test, when subjected to a lateral impact à 90° with respect to side protection device mounted on a semi-trailer.

A bumper of a Ford F-150 vehicle was secured on a frame which is itself secured on the forks of a 100 000 lbs industrial fork lift vehicle. The bumper was set to engage the net 10 perpendicularly to the length of the semi-trailer, at about 24 inches from the ground when the vehicle is moved toward the semi-trailer ST.

The semi-trailer ST weights 14007 lbs and was loaded with 61600 lbs of concrete blocks. Also, to prevent lateral displacement of the semi-trailer, the stand was resting on a rubber carpet and applied against a block of concrete weighting 4400 lbs.

A CLWG-600 linear potentiometer was installed between a portion of a frame secured on a block of concrete weighting 4400 lbs and a portion of an arm pivotably mounted on said frame and provided with an end linked to the frame supporting the bumper. When the bumper was moved against the net 10, the arm was moved and the linear potentiometer was actuated proportionally. Also, the motion of the arm allows to determine the distance the bumper penetrates under the semi-trailer ST. The industrial fork lift vehicle was moved slowly against the net 10 until said side protection device 1 was significantly damaged.

Figure 60:
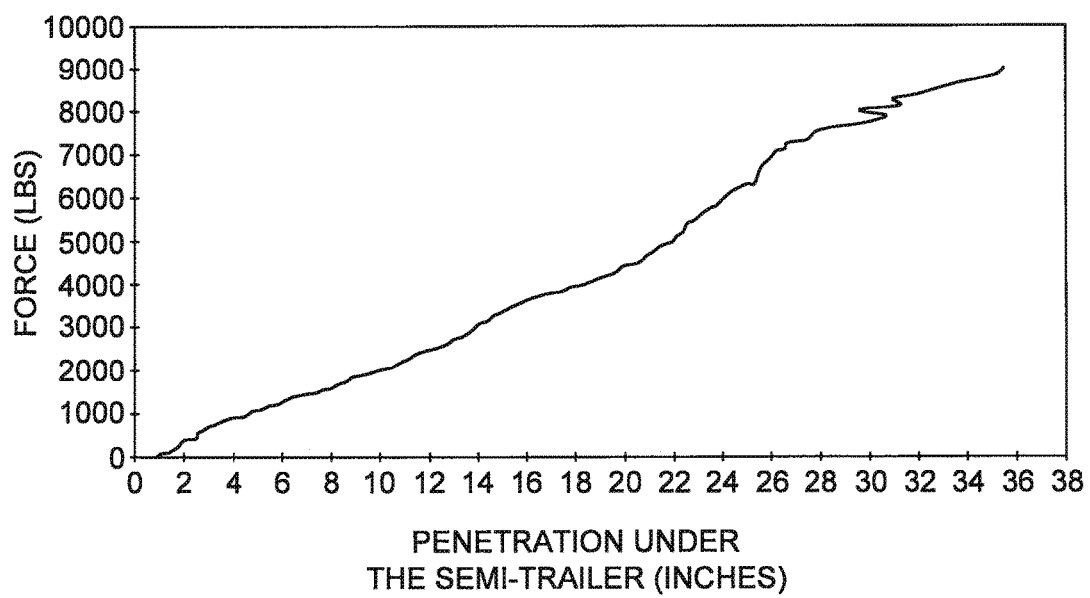
FIG. 60 represents a variation of the force applied to the side protection device according to example 2.

The force applied reached 8994 lbs with a rate of penetration of the bumper under the semi-trailer of 35.5 inches for an absorption of 748043 lb-ft (or 1014 KJ). The bumper was moved against the net 10 of the side protection device 1 for 17.73 seconds. The variation of the force applied to the side protection device is illustrated in the graph of FIG. 60. Then the industrial fork lift vehicle was moved back, the net 10 was still intact but the members 9 and 11 were disformed by the force applied.

It is to be noted that when the bumper was at 16.25 inches under the semi-trailer ST, the force applied was of 3686 lbs for an absorption of energy of 143 KJ. With reference to FIG. 50, according to a preferred embodiment, eyelets 16 can be provided on the uppermost of the flexible, elongated member of the net of straps 10. Said eyelets 16 are mounted of a cable 18 fastened between the first member 9 and the second member 11. This allows to slide the net of straps 10 along the length of the semi-trailer ST (once the flexible elongated members 13 are disconnected from the tie-down winch and/or from the openings 54, for accessing the underneath of the semi-trailer ST (e.g. for maintenance purposes).

Preferably, the cable is fastened by any appropriate means to the reinforcing member 81 and the reinforcing member 351. An example of such means may consist as illustrated in FIGS. 56 and 57, of a screw tensioner 901 and a screw tensioner 921. The screw tensioner 901 is provided with a hook element 903 engaging a corresponding opening 905 provided in the reinforcing member 81 and connecting element 907 engaging a loop 909 provided at corresponding end of the cable 18. This loop 909 is obtained by any appropriate means such as a compression ring 911. The screw tensioner 921 is provided with a hook element 923 engaging a corresponding opening 925 provided in the reinforcing member 351 and connecting element 927 engaging a loop 929 provided at corresponding end of the cable 18. This loop 929 is obtained by any appropriate means such as a compression ring 931.

Figure 52:
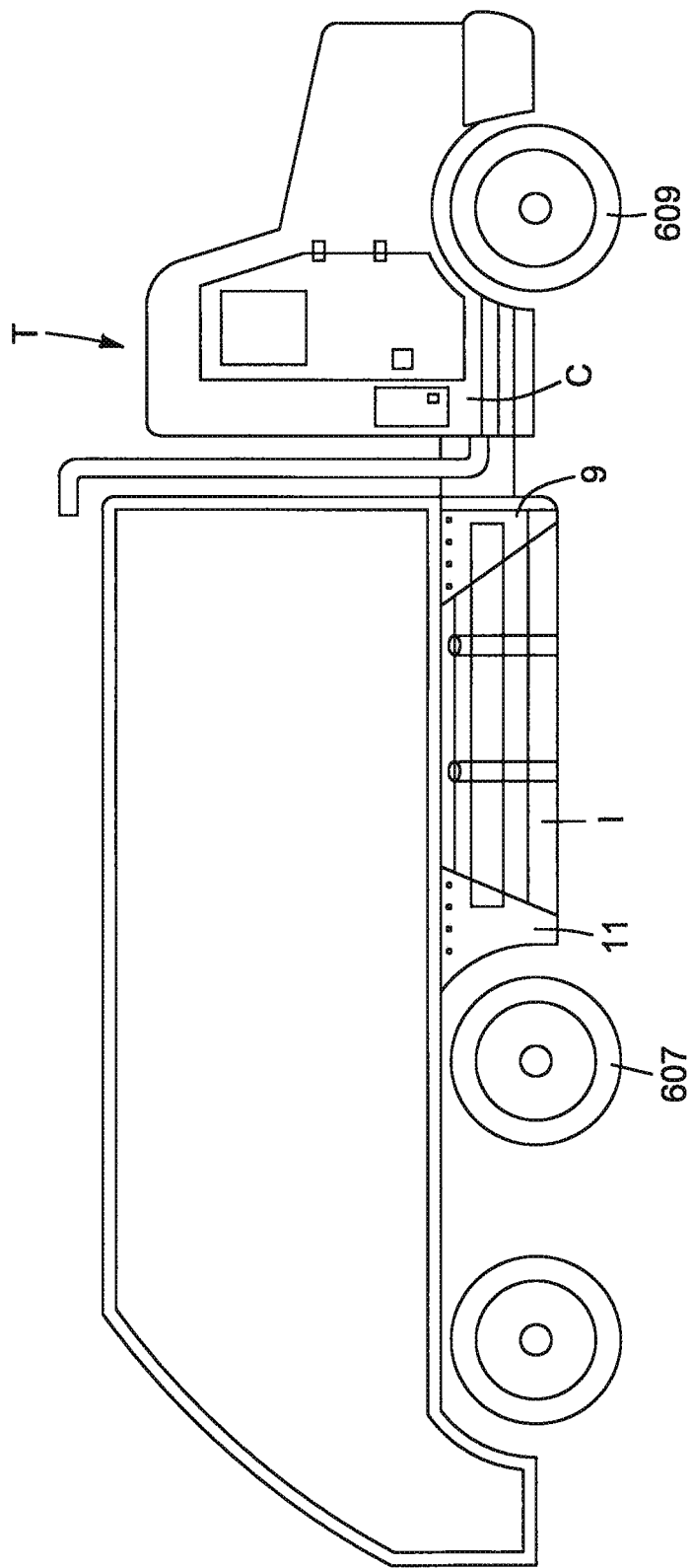
FIG. 52 represents an illustration of a preferred embodiment for securing a side protection device on a truck.

With reference to FIG. 52, according to another embodiment, the side protection device 1 according to the invention can be mounted on a truck T. Of course, in that case, the first member 9 and the second member 11 are positioned closed to the rear of the cabin C and the forward portion of the rear set of wheels. Again, preferably, a side protection device 1 is advantageously mounted on both side of the truck T. The mounting of each side protection device is similar to the one use for the semi-trailer ST.

Figure 53:
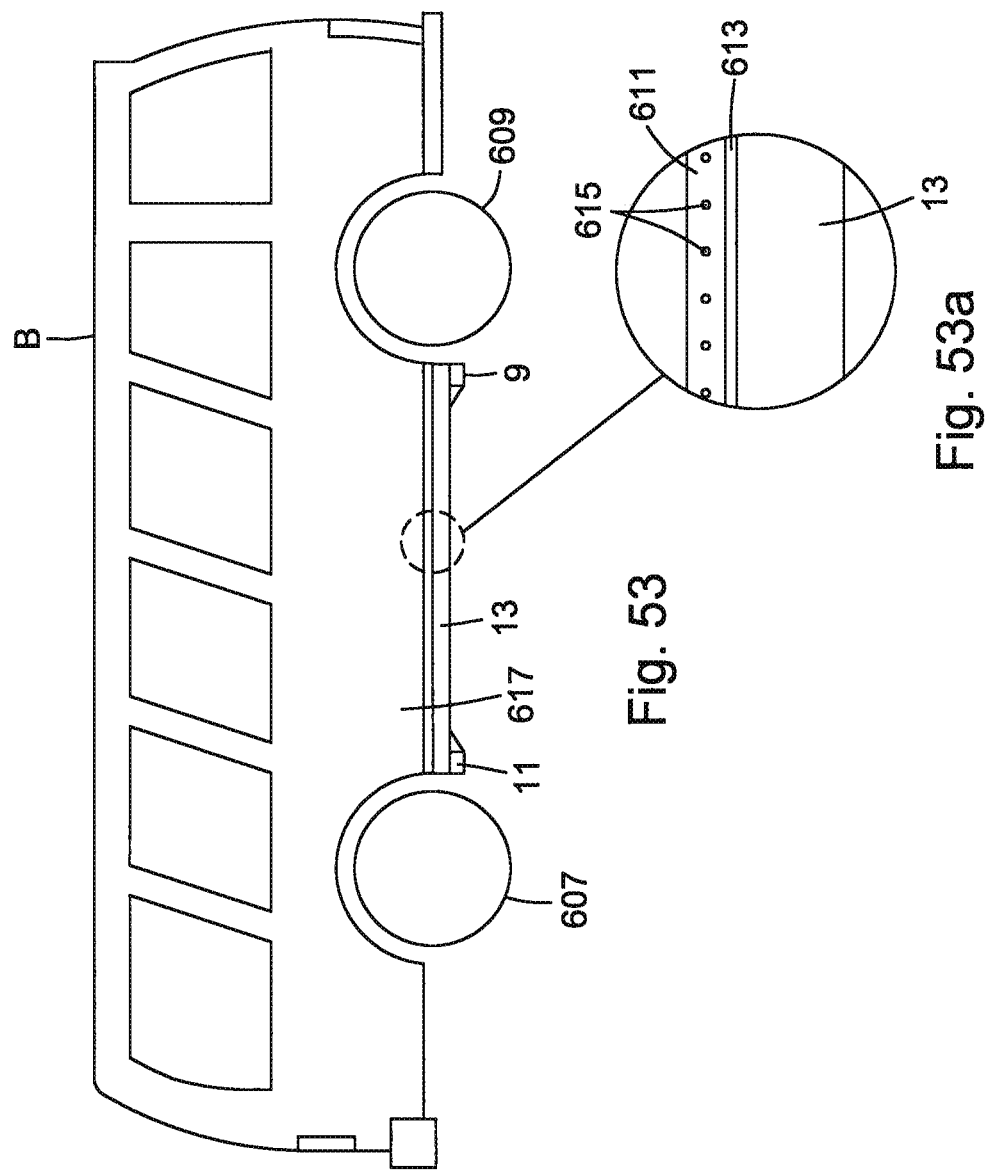
FIG. 53 represents an illustration of a preferred embodiment for securing a side protection device on a bus.
Figure 54:
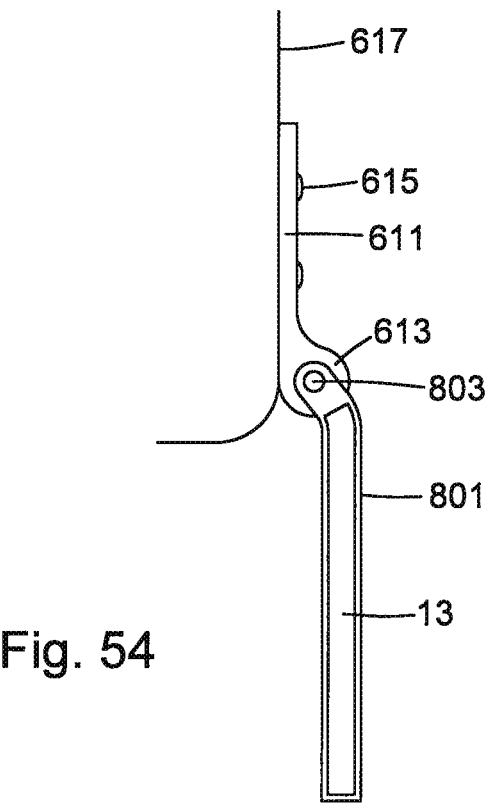
FIG. 54 represents a preferred embodiment of a clip for securing a flexible, elongated member to the body of a bus.

With reference to FIG. 53, according to another embodiment, the side protection device 1 can be installed on a bus B. More particularly, the first member 9 and the second member 11 are mounted between the rear wheels 607 and the front wheel 609. Preferably, a device 1 is installed on both sides of the bus. Of course, concerning buses having a low ground clearance, optionally, only one flexible, elongated member 13 is used. This flexible, elongated member 13 is then housed within a sleeve 801 that is further housing a cord 803. The sleeve 801 can be made of any flexible polymeric material (e.g. a polymeric material having a flexibility similar to the leather or rubber), and the cord 803 can be made of any appropriate material, especially synthetic strands. The corresponding portion of the sleeve 801 is clipped within a clipping portion of a track 611 while being slidable along the length of said slipping portion (for maintenance purposes). This track 611 is preferably an aluminum profile to be fastened to the body 617 of the bus by any appropriate means, more particularly with rivets 615. Of course, this preferred embodiment is mainly intended to prevent an individual, especially a kid to accidentally slip under the bus.

The present invention has been described with respect to its preferred embodiments. The description and the drawings are only intended to aid to the understanding of the invention and are not intended to limit its scope. It will be clear to those skilled in the art that numerous variations and modifications can be made to the implementation of the invention without being outside the scope of the invention. Such variations and modifications are covered by the present invention. The invention will be now described in the following claims.

The invention claimed is:

1. A side protection device for a vehicle comprising structural elements, a front end and a rear end, the rear end being provided with a rear set of wheels of the vehicle,
   wherein said device prevents road users or pedestrians to slip, move or enter under the vehicle, and
   wherein said device comprises:
   a first member adapted to be secured, under a lateral side of the vehicle, to the structural elements, said first member extending downwardly and either
   close to a rear portion of a front wheel of said vehicle, close to a cabin of said vehicle, or extending downwardly
   close to a location where a rear portion of a rear set of wheels of a tractor unit is to be positioned when coupled to said vehicle;
   a second member adapted to be secured, under a same lateral side of the vehicle, to said structural elements, said second member extending downwardly close and ahead a front portion of the rear set of wheels of the vehicle,
   at least one flexible, elongated member having a first end and a second end opposite to the first end;
   at least one connecting means for connecting the first end of the at least one flexible, elongated member to the first member or the second member; and
   at least one connecting/tensioning means for connecting and tensioning the at least one flexible, elongated member between the first member and the second member.

2. The side protection device of claim 1, wherein:
   the first member comprises:
   a first post provided with a top end, a bottom end and an outer surface;

said first post being further provided with a first band secured or integral with the outer surface of the first post and extending between the top end and the bottom end of the first post; a second band secured or integral with the outer surface of the first post and extending between the top end and the bottom end of first the post; and a top plate integral of the top end of the first post;
a first reinforcing member provided with a top end, a rear end and a front end; said first reinforcing member being further provided with a first band secured or integral with the top end of the first reinforcing member; and a second band secured or integral with the rear end of the first reinforcing member;
a second reinforcing member provided with a top end, a rear end and a front end; said second reinforcing member being further provided with a first band secured or integral with the top end of the second reinforcing member; and a second band secured or integral with the front end of the second reinforcing member;
at least one fastener for securing the top plate of the first post with at least one of the structural elements of the vehicle;
at least one fastener for securing the first band of the first reinforcing member with at least one of the structural elements of the vehicle;
at least one fastener for securing the first band of the second reinforcing member with at least one of the structural elements of the vehicle;
at least one fastener securing the first band of the first post with the second band of the first reinforcing member; and
at least one fastener securing the second band of the first post with the second band of the second reinforcing member; and the second member comprises:
a second post provided with a top end, a bottom end and an outer surface;
said second post being further provided with a first band secured or integral with the outer surface of the second post and extending between the top end and the bottom end of the second post; a second band secured or integral with the outer surface of the second post and extending between the top end and the bottom end of the second post; and a top plate secured or integral with the top end of the second post;
a reinforcing member of the second post provided with a top end, a rear end and a front end; said reinforcing member of the second post being further provide with a first band secured or integral with the top end of the reinforcing member of the second post; and a second band secured or integral with the rear end of the reinforcing member of the second post;
at least one fastener for securing the top plate of the second post with at least one of the structural elements of the vehicle;
at least one fastener for securing the first band of the reinforcing member of the second post with at least one of the structural elements of the vehicle; and
at least one fastener securing the first band of the second post with the second band of the reinforcing member of the second member.

3. The side protection device of claim 2, wherein:
the first post further comprises
a third band integral from the outer surface of the first post and extending near the bottom end of the first post;
at least one reinforcement brace of the first post, having a first end and a second end;
at least one fastener securing the third band of the first post with the first end of the at least one reinforcement brace of the first post; and
at least one fastener for securing the second end of the reinforcement brace of the first post with at least one of the structural elements of the vehicle; and
the second post further comprises
a third band secured or integral with the outer surface of the second post and extending near the bottom of the second post;
at least one reinforcement brace of the second post, having a first end and a second end;
at least one fastener fastening the third band with the first end of the at least one reinforcement brace of the second post; and
at least one fastener for the securing of the second end of the reinforcement brace of the second post with at least one of the structural elements of the vehicle.

4. The side protection device according to claim 3, wherein it comprises:
from 2 to 4 flexible, elongated members, each flexible, elongated member having a first end and a second end opposite to the first end;
from 2 to 4 connecting means for connecting the first end of the at least one flexible, elongated member to the first member; and
from 2 to 4 connecting/tensioning means for connecting and tensioning the at least one flexible, elongated member between the first member and the second member.

5. The side protection device of claim 3, wherein for each flexible, elongated member,
the at least one connecting means is a two-part connector, one part of said two-part connector being secured to the front end of the first reinforcing member of the first post and provided with a longitudinal cavity communicating with a longitudinal slot oriented toward the rear of the vehicle, the width of the slot being smaller than the transversal cross-section of the cavity;
the at least one connecting/tensioning means for connecting and tensioning the flexible, elongated member between the first member and the second member; is a tie-down winch comprising a frame, a winch drum provided with an opening, a ratchet wheel and a pawl, the base of said tie-down winch being secured to the second band of the reinforcing member of the second member; and
the flexible, elongated member is a strap made of synthetic material having a capacity varying from 29400 lbs to 39200 lbs, the first end of the strap being provided with a portion defining the other part of said two-part connector, said portion being formed by a key element housed within a hem of the strap, and said key element being sized and shaped for longitudinal sliding within the cavity and transversal locking within said cavity.

6. The side protection device of claim 1, wherein for each flexible, elongated member,
the at least one connecting means is a two-part connector comprising a first part and a second part, the first part of said two-part connector being an opening provided in the first member, said opening being oriented and size to receive a second part of said two-part connector;
the at least one connecting/tensioning means for connecting and tensioning the flexible, elongated member between the first member and the second member; is a tie-down winch comprising a frame, a winch drum provided with an opening, a ratchet wheel and a pawl, the base of said tie-down winch being secured to the second member; and the flexible, elongated member is a strap made of synthetic material having a capacity varying from 29400 lbs to 39200 lbs, the first end of the strap being provided with a portion provided with a hook element which is defining the second part of said connector said hook element being oriented and sized to engage the opening of the first part of the two-part connector.

7. The side protection device according to claim 4, further comprising a plurality of transversal flexible, members, said transversal flexible members being secured to the flexible, elongated members to form a net of straps, wherein each flexible, elongated member and each transversal flexible member is made of polyester material or Nylon®, and wherein the flexible, elongated members are 3 to 5 inches width and tensioned between the first post and the second post at about 300 pounds.

8. The side protection device according to claim 1, wherein when the vehicle is a bus, it further comprises a clip for fastening the upper portion of a flexible, elongated member to the body of the bus.

9. The side protection device according to claim 7, wherein the net of straps is provided with eyelets allowing to suspend the same on a cable positioned between the first post and the second post, and wherein the net of straps is further covered by a curtain of textile material allowing to define a skirt underneath the vehicle.

10. The side protection device of claim 3, wherein a pair of side protection devices which are a mirror image from each other, are to be secured on both lateral sides of the vehicle, and wherein said pair of side protection devices further comprise:

between the first post posts of said side protection devices, a second reinforcement brace having a first end and a second end; at least one fastener securing the first end of the second reinforcement brace with the third band of the one of the first posts, and at least one fastener securing the second end of the second reinforcement brace with the third band of the other first post; and between the second posts of said side protection devices, a second reinforcement brace having a first end and a second end; at least one fastener securing the first end of the second reinforcement brace with the third band of the one of the second post, and at least one fastener securing the second end of the second reinforcement brace with the third band of the other of the second posts.

11. The side protection device of claim 3, wherein a pair of side protection devices which are a mirror image from each other, are to be secured on both lateral sides of the vehicle, and wherein said pair of side protection devices further comprise:

provided on the third band of each of the first posts, means adapted to be engaged by at least one fastener, between the first posts, a second reinforcement brace having a first end and a second end, the first end being provided with means adapted to be engaged by at least one fastener and the second end being provided with means adapted to be engaged by at least one fastener;

at least one fastener engaging the means of the first end of the second reinforcement brace and the means of the third band of one of the first posts for securing the first end of the second reinforcement brace with the third band of the one of the first posts; and at least one fastener engaging the means of the second end of the second reinforcement brace and the means of the third band of the other of the first posts for securing the second end of the second reinforcement brace with the third band of the other of the first posts;

provided on the third band of the second posts, means adapted to be engaged by at least one fastener; and between the second post a second reinforcement brace having a first end and a second end, the first end being provided with means adapted to be engaged by at least one fastener; and the second end being provided with means adapted to be engaged by at least one fastener;

at least one fastener engaging the means of the first end of the second reinforcement brace and the means of the third band of one of the second posts for securing the first end of the second reinforcement brace with the third band of the one of the second posts, and at least one fastener engaging the means of the second end of the second reinforcement brace and the means of the third band of the other of the second posts for securing the second end of the second reinforcement brace with the third band of the other of the second posts.

12. A vehicle comprising structural elements, a front end and a rear end, the rear end being provided with a rear set of wheels of the vehicle, said vehicle being provided with at least one side protection device as defined in claim 1.

13. A kit for mounting a side protection device to a vehicle comprising structural elements, a front end and a rear end, the rear end being provided with a rear set of wheels of the vehicle, for preventing road user or pedestrians to slip, move or enter under the vehicle, said kit comprising:

a first member adapted to be secured, under a lateral side of the vehicle, to the structural elements, said first member extending downwardly and either close to a rear portion of a front wheel of said vehicle, close to a cabin of said vehicle, or close to a location where a rear portion of a rear set of wheels of a tractor unit is to be positioned when coupled to said vehicle;

a second member adapted to be secured, under a same lateral side of the vehicle, to said structural elements, said second member extending downwardly close and ahead a front portion of the rear set of wheels of the vehicle, at least one flexible, elongated member having a first end and a second end opposite to the first end;

at least one connecting means for connecting the first end of the at least one flexible, elongated member to the first member or the second member; and at least one connecting/tensioning means for connecting and tensioning the at least one flexible, elongated member between the first member and the second member.

14. The kit of claim 13, wherein:

the first member comprises:

a first post provided with a top end, a bottom end and an outer surface; said first post being further provided with a first band secured or integral with the outer surface of the first post and extending between the top end and the bottom end of the first post; a second band secured or integral with the outer surface of the first post and extending between the top end and the bottom end of the first post; and a top plate secured or integral with the top end of the first post;

a first reinforcing member provided with a top end, a rear end and a front end; said first reinforcing member being further provided with a first band secured or integral with the top end of the first reinforcing member; and a second band secured or integral with the rear end of the first reinforcing member;

a second reinforcing member provided with a top end, a rear end and a front end; said second reinforcing member being further provided with a first band secured or integral with the top end of the second reinforcing member; and a second band secured or integral with the front end of the second reinforcing member;

at least one fastener for securing the top plate of the first post with at least one of the structural elements of the vehicle;

at least one fastener for securing the first band of the first reinforcing member with at least one of the structural elements of the vehicle;

at least one fastener for securing the first band of the second reinforcing member with at least one of the structural elements of the vehicle;

at least one fastener for securing the first band of the first post with the second band of the first reinforcing member; and at least one fastener for securing the second band of the first post with the second band of the second reinforcing member; and the second member comprises:

a second post provided with a top end, a bottom end and an outer surface; said second post being further provided with a first band secured or integral with the outer surface of the second post and extending between the top end and the bottom end of the second post; a second band secured or integral with the outer surface of the second post and extending between the top end and the bottom end of the second post; and a top plate secured or integral with the top end of the second post;

a reinforcing member of the second post, provided with a top end, a rear end and a front end; said reinforcing member of the second post being further provided with a first band secured or integral with the top end of the reinforcing member of the second post; and a second band secured or integral with the rear end of the reinforcing member of the second post;

at least one fastener for the fastening of the top plate of the second post with at least one of the structural elements of the vehicle;

at least one fastener for securing the first band of the reinforcing member of the second post with at least one of the structural elements of the vehicle; and at least one fastener for securing the second band of the second post with the second band of the reinforcing member of the second post.

15. The kit of claim 14, wherein the first post further comprises
a third band secured or integral with the outer surface of the first post and extending near the bottom end of the first post;
at least one reinforcement brace of the first post, having a first end and a second end;
at least one fastener for securing the third band of the first post with the first end of the at least one reinforcement brace of the first post; and
at least one fastener for securing the second end of the at least one reinforcement brace of the first post, with at least one of the structural elements of the vehicle; and the second post further comprises
a third band secured or integral with the outer surface of the second post and extending near the bottom end of the second post;
at least one reinforcement brace of the second post, having a first end and a second end;
at least one fastener for securing the third band of the second post, with the first end of the at least one reinforcement brace of the second post; and
at least one fastener for securing the second end of the at least one reinforcement brace of the second post, with at least one of the structural elements of the vehicle.

16. The kit of claim 15, wherein for each flexible, elongated member,
the at least one connecting means is a two-part connector, one part of said two-part connector being secured to the front end of the first reinforcing member of the first post and provided with a longitudinal cavity communicating with a longitudinal slot oriented toward the rear of the vehicle, the width of the slot being smaller than the transversal cross- section of the cavity;
the at least one connecting/tensioning means for connecting and tensioning the flexible, elongated member between the first member and the second member; is a tie-down winch comprising a frame, a winch drum provided with an opening, a ratchet wheel and a pawl, the base of said tie-down winch being secured to the second band of the reinforcing member of the second member; and
the flexible, elongated member is a strap made of synthetic material having a capacity varying from 29400 lbs to 39200 lbs, the first end of the strap being provided with a portion defining the other part of said two-part connector, said portion being formed by a key element housed within a hem of the strap, and said key element being sized and shaped for longitudinal sliding within the cavity and transversal locking within said cavity.

17. The kit of claim 15, wherein for each flexible, elongated member,
the at least one connecting means is a two-part connector comprising a first part and a second part, the first part of said two-part connector being an opening provided in the first member, said opening being oriented and size to receive a second part of said two-part connector;
the at least one connecting/tensioning means for connecting and tensioning the flexible, elongated member between the first member and the second member; is a tie-down winch comprising a frame, a winch drum provided with an opening, a ratchet wheel and a pawl, the base of said tie-down winch being secured to the second member; and
the flexible, elongated member is a strap made of synthetic material having a capacity varying from 29400 lbs to 39200 lbs, the first end of the strap being provided with a portion provided with a hook element which is defining the second part of said connector said hook element being oriented and sized to engage the opening of the first part of the two-part connector.

18. The kit according to claim 16, further comprising a plurality of transversal flexible, members, said transversal flexible members being secured to the flexible, elongated members to form a net of straps, wherein each flexible, elongated member and each transversal flexible member is made of polyester material or Nylon®, and wherein the flexible, elongated members are 3 to 5 inches width and tensioned between the first post and the second post at about 300 pounds.

19. The kit according to claim 1, wherein when the vehicle is a bus, it further comprises a clip for fastening the upper portion of a flexible, elongated member to the body of the bus.

20. The kit according to claim 18, wherein the net of straps is provided with eyelets allowing to suspend the same on a cable positioned between the first post and the second post, and wherein the of straps is further covered by a curtain of textile material allowing to define a skirt underneath the vehicle.

21. The side protection device of claim 15, wherein a pair of side protection devices which are a mirror image from each other, are to be secured on both lateral sides of the vehicle, and wherein said pair of side protection devices further comprise:
- between the first posts of said side protection devices, a second reinforcement brace having a first end and a second end; at least one fastener securing the first end of the second reinforcement brace with the third band of one of the first posts, and at least one fastener securing the second end of the second reinforcement brace with the third band of the other of the first posts; and
- between the second posts of said side protection devices, a second reinforcement brace having a first end and a second end; at least one fastener securing the first end of the second reinforcement brace with the third band of the one of the second posts, and at least one fastener securing the second end of the second reinforcement brace with the third band of the other of the second posts.

22. The kit of claim 15, wherein a pair of side protection devices which are a mirror image from each other, are to be secured on both lateral sides of the vehicle, and wherein said pair of side protection devices further comprise:
- provided on the third band of each of the first posts, means adapted to be engaged by at least one fastener;
- between the first posts, a second reinforcement brace having
  - a first end and a second end, the first end being provided with means adapted to be engaged by at least one fastener and the second end being provided with means adapted to be engaged by at least one fastener;
  - at least one fastener engaging the means of the first end of the second reinforcement brace and the means of the third band of one of the first posts for securing the first end of the second reinforcement brace with the third band of the one of the first posts; and
  - at least one fastener engaging the means of the second end of the second reinforcement brace and the means of the third band of the other of the first posts for securing the second end of the second reinforcement brace with the third band of the other of the first posts; and
- provided on the third band of each of the first posts, means adapted to be engaged by at least one fastener;
- between the second posts,
  - a second reinforcement brace having a first end and a second end, the first end being provided with means adapted to be engaged by at least one fastener; and the second end being provided with means adapted to be engaged by at least one fastener;
  - at least one fastener engaging the means of the first end of the second reinforcement brace and the means of the third band of one of the second posts for securing the first end of the second reinforcement brace with the third band of the one of the second posts, and
  - at least one fastener engaging the means of the second end of the second reinforcement brace and the means of the third band of the other of the second posts for securing the second end of the second reinforcement brace with the third band of the other of the second posts.

23. The side protection device of claim 1, wherein
the at least one connecting means connects the first end of the at least one flexible, elongated member to the first member;
the first band of the first member is secured or integral with the outer surface of the first post and extends between a top end and a bottom end of the first post;
the second band of the first member is secured or integral with the outer surface of the first post and extends from the top end to the bottom end of the first post;
the first band of the second member is secured or integral with the outer surface of the second post and extends from a top end to a bottom end of the second post; and
the second band of the second member is secured or integral with the outer surface of the second post and extends from the top end to the bottom end of the second post.

24. The kit of claim 15, wherein
the at least one connecting means connects the first end of the at least one flexible, elongated member to the first member;
the first band of the first member is secured or integral with the outer surface of the first post and extends between a top end and a bottom end of the first post;
the second band of the first member is secured or integral with the outer surface of the first post and extends from the top end to the bottom end of the first post;
the first band of the second member is secured or integral with the outer surface of the second post and extends from a top end to a bottom end of the second post; and
the second band of the second member is secured or integral with the outer surface of the second post and extends from the top end to the bottom end of the second post.

* * * * *